(12) United States Patent
Satorius

(10) Patent No.: US 7,484,737 B2
(45) Date of Patent: Feb. 3, 2009

(54) TOWABLE PACK CARRIER

(76) Inventor: Dale Jeffrey Satorius, 6628 118th Ave. SE., Bellevue, WA (US) 98006

( * ) Notice: Subject to any disclaimer, the term of this patent is extended or adjusted under 35 U.S.C. 154(b) by 149 days.

(21) Appl. No.: 11/108,086

(22) Filed: Apr. 16, 2005

(65) Prior Publication Data

US 2006/0237918 A1    Oct. 26, 2006

(51) Int. Cl.
*B62D 51/04* (2006.01)
(52) U.S. Cl. .................... 280/1.5; 280/47.32
(58) Field of Classification Search ............. 280/1.5, 280/47.32, 47.18; 224/184, 153
See application file for complete search history.

(56) References Cited

U.S. PATENT DOCUMENTS

| 3,305,244 | A | * | 2/1967 | Flagg ................... 280/47.35 |
| 3,328,043 | A | * | 6/1967 | Johnson ................... 280/1.5 |
| 3,560,015 | A | * | 2/1971 | Tracy et al. ............. 280/47.3 |
| 3,856,191 | A | * | 12/1974 | Pohl ........................ 224/262 |
| 4,236,723 | A |   | 12/1980 | Lemmon |
| 4,368,835 | A | * | 1/1983 | Murphy ................... 224/153 |
| 4,664,395 | A |   | 5/1987 | McCoy |
| 4,838,565 | A |   | 6/1989 | Douglas et al. |
| 5,215,318 | A |   | 6/1993 | Capraro |
| 5,385,355 | A |   | 1/1995 | Hoffman |
| 5,769,431 | A | * | 6/1998 | Cordova ................. 280/1.5 |
| 6,283,496 | B1 | * | 9/2001 | Dickmann ............... 280/652 |
| 6,431,556 | B1 | * | 8/2002 | Beardsley et al. ......... 280/1.5 |
| 6,942,228 | B2 | * | 9/2005 | Bunce et al. .............. 280/30 |
| 2004/0150175 | A1 |   | 8/2004 | Cepull |
| 2004/0183263 | A1 | * | 9/2004 | Joncourt ................. 280/1.5 |

* cited by examiner

*Primary Examiner*—Paul N. Dickson
*Assistant Examiner*—Maurice Williams
(74) *Attorney, Agent, or Firm*—Janeway Patent Law PLLC

(57) ABSTRACT

A versatile carrier is provided having the ability to switch from a configuration being towed behind a user to a configuration being carried on the user's back like a conventional backpack. The carrier is comprised of a frame having a front end and a rear end, a linkage member having a front end and a rear end, a harness, and at least one wheel coupled to the rear end of the frame. The front end of the linkage member is coupled to the harness while the rear end is couple to the frame. The coupling allows the front end of the frame to be supported by the linkage member. The coupling also allows the frame to transfer from the towed position to the user's back with ease and without removal of the carrier from the user.

7 Claims, 21 Drawing Sheets

TOWABLE PACK CARRIER

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION—FIELD OF INVENTION

This invention relates to a personal carrier, specifically to a personal carrier attached to an individual using a harness.

BACKGROUND OF THE INVENTION—PRIOR ART

Hikers normally use the conventional means of a backpack to transport gear on journeys. The backpack is typically loaded with about 60 pounds of gear and food on a typical trip. Carrying the backpack over uneven terrain requires strength and endurance as well as assistance getting the backpack on and off the hiker's back. The backpack allows the hiker to transport loads over obstacles such as footbridges, which make other methods of transporting the load, such as wheeled carriers, impractical. This practicality of the backpack comes at the cost of increased fatigue, increased risk of injury should the hiker fall, reduced freedom of motion, and reduced enjoyment of the journey.

Thus there is a need for a wheeled apparatus that can provide mobility for the user, increase freedom of motion, reduce the amount of weight that the user must carry, and traverse obstacles encountered on a trail. Having a wheeled travois that is capable of being towed behind the user with the wheel on the ground and being carried like a conventional backpack would benefit the user greatly. The prior art represents a broad spectrum of user towed wheeled carriers for the purpose of transporting a load over terrain. All of these carriers have limitations which inhibit the comfort and freedom of motion of the user and/or make it difficult to transfer the load to the users back when needed. The focus of attention herein is on carriers having a wheeled load-carrying frame that is attachable to the user's body and capable of being towed behind the user.

Prior art can be divided into three types of wheeled carriers. Type one carriers are carried on the user's back and can be removed from the back to be pushed by hand. These include Barry and Cahill, U.S. Pat. No. 493,348, Talbott, U.S. Pat. No. 2,401,986, Mantell, U.S. Pat. No. 3,144,014, Strand, U.S. Pat. No. 3,550,997, Tracy, U.S. Pat. No. 3,560,015, Lange, U.S. Pat. No. 4,593,841, Murphy, U.S. Pat. No. 4,368,835. Type two carriers are attachable to the user's waist. These include Pohl, U.S. Pat. No. 3,856,191, Lemon, U.S. Pat. No. 4,236,723, Capraro, U.S. Pat. No. 5,215,318, Giovannoni, U.S. Pat. No. 2,613,953, and Cepull, Pat. application 20040150175. Type three carriers are attachable to a frame worn on the user's back. These include Hoffman, U.S. Pat. No. 5,385,355, McCoy, U.S. Pat. No. 4,664,395, Douglas et al. U.S. Pat. Nos. 4,838,565 and 5,005,844, and Cordova, U.S. Pat. No. 5,769,431.

All of these carriers suffer from a number of disadvantages.

(a) The major drawback of all of these carriers is that the loaded carrier cannot be conveniently and quickly transferred from the tow position with the wheel on the ground to a position being carried on a user's back like a conventional backpack. On a trail, a carrier that can conveniently transfer from the tow position to the carry position is necessary since trail conditions are unpredictable and at times require the load to be carried on the user's back.

(b) Another drawback of the type three carriers listed above is the harness frame being attached to the user's back. The frame inhibits the ability of the user to freely move their back leading to discomfort when towing the carrier. Also towing the carrier this way puts undo weight on the user's back causing fatigue and increasing the risk of injury should the user stumble and fall. The type one carrier has a similar drawback in that the user bears the weight of the load with their hands and arms causing the users hands, arms, and back to fatigue while severely limiting the freedom of motion of the back.

(c) The type two carriers mentioned above have a waist harness, however the user lacks the ability to pivot left and right while towing the carrier. Having the ability to pivot is necessary when navigating tight bends on a trail.

(d) All of these carriers have the inability to access the equipment that is being carried without removing the carrier to access it. This inability to access the load was an unknown problem that was never addressed before.

Of the type one and two patents listed above, only Pohl, U.S. Pat. No. 3,856,191 is capable of being carried on the back like a conventional pack and removed and reconfigured to be towed behind the user via a belt type harness. However, there are several drawbacks to this design. The first is the difficulty in converting the carrier to a configuration that can be towed behind the user with the wheels on the ground. Members of the frame need to be reconfigured with fasteners and the attachment points need to be connected to the user harness. This reconfiguration makes the dual position features of the carrier impractical and time consuming for standard trail conditions that would require multiple reconfigurations. Another drawback is the inability of the user to turn freely to the left or right without causing stress between the belt and user that would cause skin chaffing and discomfort. The only way the user could make a turn in this design is by a clumsy sidestepping turn.

Of the type 3 patents listed above, only the Hoffman, U.S. Pat. No. 5,385,355 is capable of being reconfigured from the tow position to a back carry position. However, there are several drawbacks inherent in this design. To transfer the frame to the back carry position, the user must remove the back harness and remove and reattach the frame. Then the user must remount the carrier to their back. This would be inconvenient and time consuming for standard trail conditions that would require multiple reconfigurations of the carrier. Another drawback to this design is that the back harness limits the freedom of motion of the user as a rigid frame and a load is now attached to the back much like a conventional framed back pack. The simple act of leaning forward and aft, left and right would impose stain on the user's back and cause discomfort to the user. The shape of the carrier frame also creates its own drawbacks. Conventional hiking gear such as duffels or packs would be difficult to affix to the frame. The user would have to use special saddle style equipment such as that recommended by Hoffman in the patent. Also, the benefit of the wheeled travois design is that the wheel carries some of the weight of the load. This benefit is gained when the load is placed close to or over the wheel. With the design described in this patent, there is no provision to affix the load over or around the wheel. The design of the frame positions most of the load equidistant from the user to the wheel. One other drawback of the design is that the frame and load can interfere with the user's stride especially when going up hill. The design of this carrier required the load to be as low as possible in order to help stabilize the carrier. Unfortunately, the frame and load encroached into the area behind the user's legs.

A design of a travois backpack by inventor Wilcziek is lacking on some key design points. This design may be patent pending. The Wilzciek design has a user worn belt and a wheeled carrier pivotally attached to the rear of the belt. The carrier may be composed of a two-section frame that pivots about a central hinge point to allow the carrier to be reconfigured to be carried on the back like a conventional pack. One key drawback of the Wilcziek design is that the user must remove the carrier and reconfigure it to be carried on the user's back or have another person perform the task. Second, the user appears to have limited pivot ability in the belt harness that would make navigating turns on trails difficult and uncomfortable for the user. The third problem with this design is that there is no access to the load that is being carried on the carrier. It is located at the rear of the carrier and even if there was substantial pivot ability of the belt, the user cannot reach the load.

Douglas, U.S. Pat. Nos. 4,838,565 and 5,005,844 describe a carrier having several drawbacks. Like the Hoffman, U.S. Pat. No. 5,385,355 patent discussed above, the Douglas design has a frame attached to the user's back that inhibits freedom of motion of the user. The simple act of leaning forward, aft, left and right would impose strain on the user's back and cause discomfort to the user. Again like the Hoffman design, the carrier frame design keeps the load away from the wheel and reduces the benefit of having the wheels bear more of the weight of the load. Another drawback of the Douglas design is the several disks that roll on the ground. Douglas says these discs are configurable depending on the type of terrain traveled on. The number of disks which would need to change would make this task difficult and time consuming and make taking this design on a trail with varying terrain undesirable. The disks also add considerable weight to the cart causing the user to work harder to move the cart. This weight will be especially felt during the walking of the user when the cart momentarily stops and starts again in rhythm with the user's walking pace.

Lemmon, U.S. Pat. No. 4,236,723 attempts to reduce the weight of the load carried by the user by configuring the frame such that the load is directly over the wheels. This design raises the center of gravity of the load high above the stability axis that necessitates the need for two wheels. Another drawback of this design is again the inability of the user to turn left or right as in the Pohl U.S. Pat. No. 3,856,191, which causes user discomfort and inability to navigate turns in a trail. These two drawbacks make this design unusable for most trail conditions.

Cepull, Pat. application 20040150175 shows a travois design attached to a user with a shoulder harness. With this design, the user has no ability to transfer the carrier to their back. Also, the user can pivot within the harness only when the waist belt is worn loosely which means the user's shoulders must bear the weight of the carrier in order to have turning ability. Carrying the load on the user's back will increase user fatigue and discomfort. Also, with a loose waist belt, the user will experience discomfort caused by the carrier hitting them with each stride. In order for the user to bear the weight entirely on the user's hips, the belt must be worn tightly around the user's waist which removes the user's turning ability.

There are advantages to having a carrier that is capable of quickly and easily switching from a position towed by the user to a position carried on the user's back much like that of a conventional backpack. There are also advantages to having the carrier attach to the user with a waist harness so the entire back is free to flex and rotate which creates comfort for the user when the load is towed with the wheel on the ground. Also, the waist harness creates a more stable walking condition as the user has the load low around his waist instead of high on the back. It is also safer in that if the user falls, any injury would not be compounded by the weight of the loaded carrier on the user's back. There is also an advantage to have an attachment point on the waist harness such that the user can pivot from right to left such as when turning to navigate bends in a trail or to gain access to load being towed. A further advantage is a carrier that can carry conventional hiking gear such as duffels and backpacks. There is yet another advantage to having a carrier such that the load can be placed next to the wheel to maximize the benefit of the weight distribution.

BACKGROUND OF INVENTION—OBJECTS AND ADVANTAGES

The objects and advantages of the invention are as follows:

(a) It is an object of this invention to provide a wheeled travois that overcomes the inadequacies and inherent flaws of the prior art.

(b) It is an object of this invention to provide a wheeled travois carrier capable of being transferred quickly from the user-towed position with the wheel on the ground to the user's back to be carried like a convention backpack. This transfer can be accomplished without the need of another person and without the need to remove equipment from the user. This allows the travois to be carried over obstacles which it could not be towed over much like the way a conventional backpack is used. It also greatly increases the type of terrain that the travois can be conveniently used on since the user will not be hindered by the time consuming reconfiguration of the carrier. This object also solves the problem of how a heavily loaded pack is placed onto a hikers back.

(c) It is an object of this invention to provide a carrier that does not hinder the freedom of motion of the user's back when being towed with the wheel on the ground. This will greatly increase user comfort and enjoyment as the back can now be moved and flexed normally. Prior art utilizes a back frame type harness that makes the back rigid.

(d) It is an object of this invention to remove the weight of the load from the user's back when the travois is being towed with the wheel on the ground. This will reduce fatigue and strain on the user's back. This also makes the carrier safer to carry as the user is more stable, as the harness is not high on the user's back but lower around the user's waist. It is also safer to transport a load in the tow position with the wheel on the ground in that if the user falls, any injury would not be compounded by the weight of the loaded carrier on the user's back.

(e) It is an object of this invention to be able to carry conventional hiking equipment such as duffels and backpacks. Once at a destination, the user has the option to remove the carrier and leave it behind while wearing the conventional hiking pack for exploration.

(f) It is an object of this invention to reduce the weight of the load carried by the user by transferring a minimum of 60 percent of this weight to the carrier. This reduction in weight will reduce the fatigue of the user causing the user to consume less food and water as well as increasing user enjoyment.

(g) It is an object of this invention to utilize the space around the wheel to stow a portion of the load. With a travois type carrier, the closer the center of gravity of the load is to the wheel, the smaller the amount of load the user supports.

(h) It is an object of this invention to allow the user to rotate left and right while towing the carrier with the wheel on the ground. This allows the user to navigate the turns and bends in a trail easily (i) It is an object of this invention to allow the user to rotate inside the user harness a full 360 degrees when towing the carrier with the wheel on the ground. The user then can access the gear readily without removing the harness. Also the user can backtrack out of a tight spot by quickly turning around and pushing the carrier in front of them.

(j) Another object of this invention is to provide a wheeled carrier capable of being pulled over obstructions larger than the wheel.

(k) Another object of this invention is to provide comfort to the user while towing the carrier with the wheel on the ground. This is accomplished by configuring the user harness such that the pulling force is transferred mostly to the user's hips while minimizing the pulling force felt on the user's lower abdomen.

Further objects and advantages of this invention will become apparent from a consideration of the drawings and ensuing description.

SUMMARY

In accordance with the present invention a travois type carrier comprises a user harness and a wheeled frame joined together by a linkage mechanism.

DRAWINGS—FIGURES

DRAWING—REFERENCE NUMERALS

| | |
|---|---|
| 26 | first angled section |
| 27 | first linkage angled section |
| 28 | second angled section |
| 29 | second linkage angled section |
| 30 | carrier |
| 32 | left frame side member |
| 33 | frame assembly |
| 34 | right frame side member |
| 35L | alignment guide |
| 35R | alignment guide |
| 35L' | alignment guide for pin |
| 36 | front frame cross member |
| 37 | rear frame cross member |
| 38 | right linkage member |
| 39 | linkage assembly |
| 40 | left linkage member |
| 42 | pin |
| 44L | left pivot mount |
| 44R | right pivot mount |
| 46 | belt |
| 47L | left hip pad |
| 47R | right hip pad |
| 48 | buckle |
| 50 | harness assembly |
| 52 | belt reinforcement member |
| 54 | shoulder straps |
| 56 | load securing mechanism |
| 58 | load securing mechanism |
| 60 | strap 1 |
| 62 | strap 2 |
| 64 | load support |
| 66 | alternate hole |
| 68 | female coupler |
| 70 | male coupler |
| 72 | load basket |
| 74 | axle |
| 76 | wheel |
| 78 | wheel well |
| 80L | left hitch mechanism |
| 80R | right hitch mechanism |
| 82 | hitch pivot |
| 84 | hitch base |
| 86 | locknut |
| 88 | 2-wheeled carrier assy. |
| 90 | 2-wheeled carrier frame |

-continued

| | |
|---|---|
| 92 | left frame member |
| 94 | right frame member |
| 96 | front cross member |
| 98 | rear cross member |
| 99 | load basket |
| 100L | left wheel |
| 100R | right wheel |
| 102 | wheel bolt |
| 104 | carrier assembly |
| 106 | linkage assembly |
| 108 | left linkage member |
| 110 | right linkage member |
| 112 | clevis |
| 114 | clevis pin |
| 116 | clevis fastener |
| 118 | harness assy |
| 120 | inner belt |
| 122 | inner belt buckle |
| 124 | belt reinforcement member |
| 126 | outer slide belt |
| 128 | outer belt buckle |
| 130 | belt extension |
| 132 | belt extension |
| 134 | upper track guide |
| 136 | lower track guide |
| 138 | quick release pin |
| 150 | carrier assembly |
| 152 | linkage assembly |
| 154 | left linkage member |
| 155 | angled section on left member |
| 156 | right linkage member |
| 157 | angled section on right member |
| 158L | pivot mount |
| 158R | pivot mount |
| 162 | harness assembly |
| 164 | belt |
| 165 | belt reinforcement member |
| 166 | buckle |
| 168 | hitch base |
| 170 | upper pivot mount |
| 172 | lower pivot mount |
| 174 | hitch pivot |
| 176 | pivot fastener |
| 180 | quick release pin |
| 182 | angled bracket |
| 186 | shoulder harness |
| 188L | left securing strap |
| 188R | right securing strap |
| 190 | female fastening mechanism |
| 192 | male fastening mechanism |
| 194L | left securing strap |
| 194R | right securing strap |
| 200 | carrier assembly |

DETAILED DESCRIPTION—PREFERRED EMBODIMENT

Figure 1B:
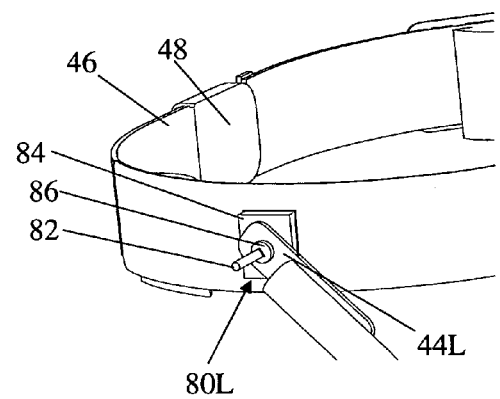
FIG. 1B shows a close-up view of carrier's hitch mechanism.
Figure 1A:
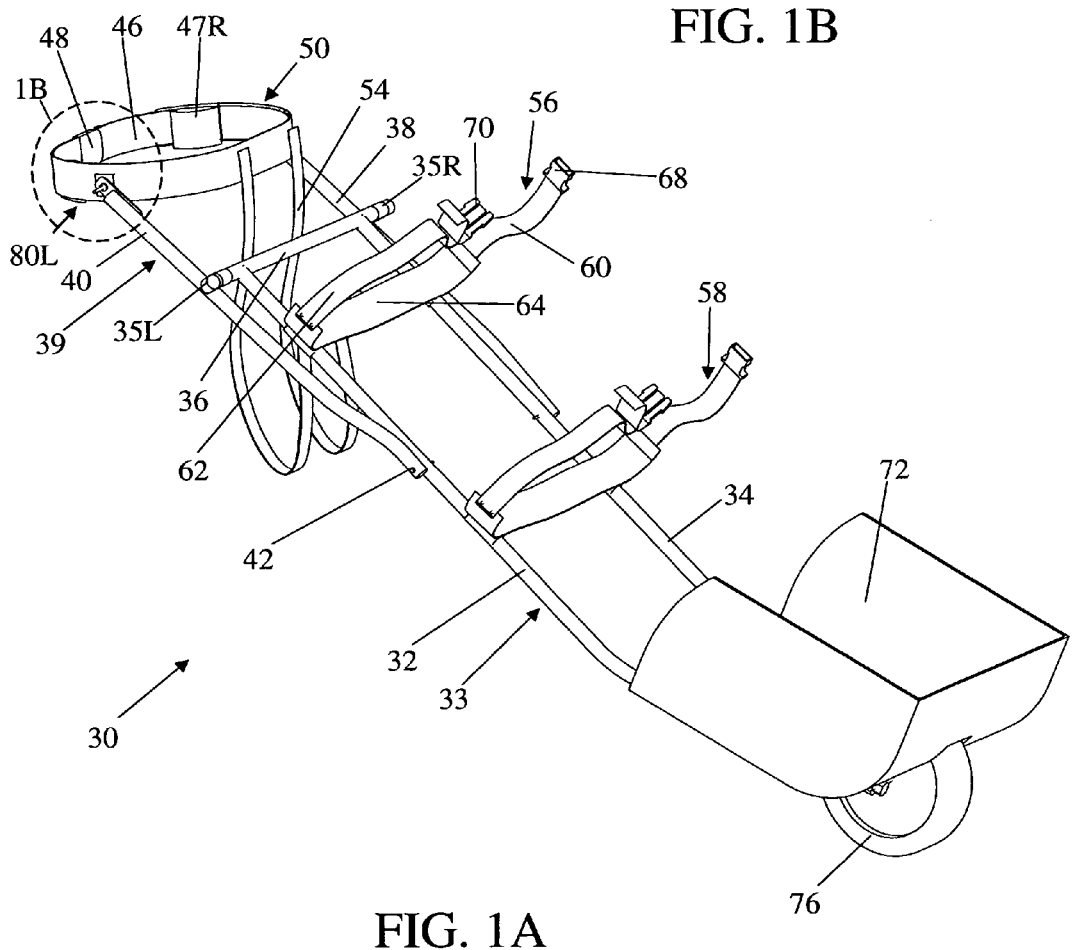
FIG. 1A shows a side-rear view of a carrier.
Figure 2:
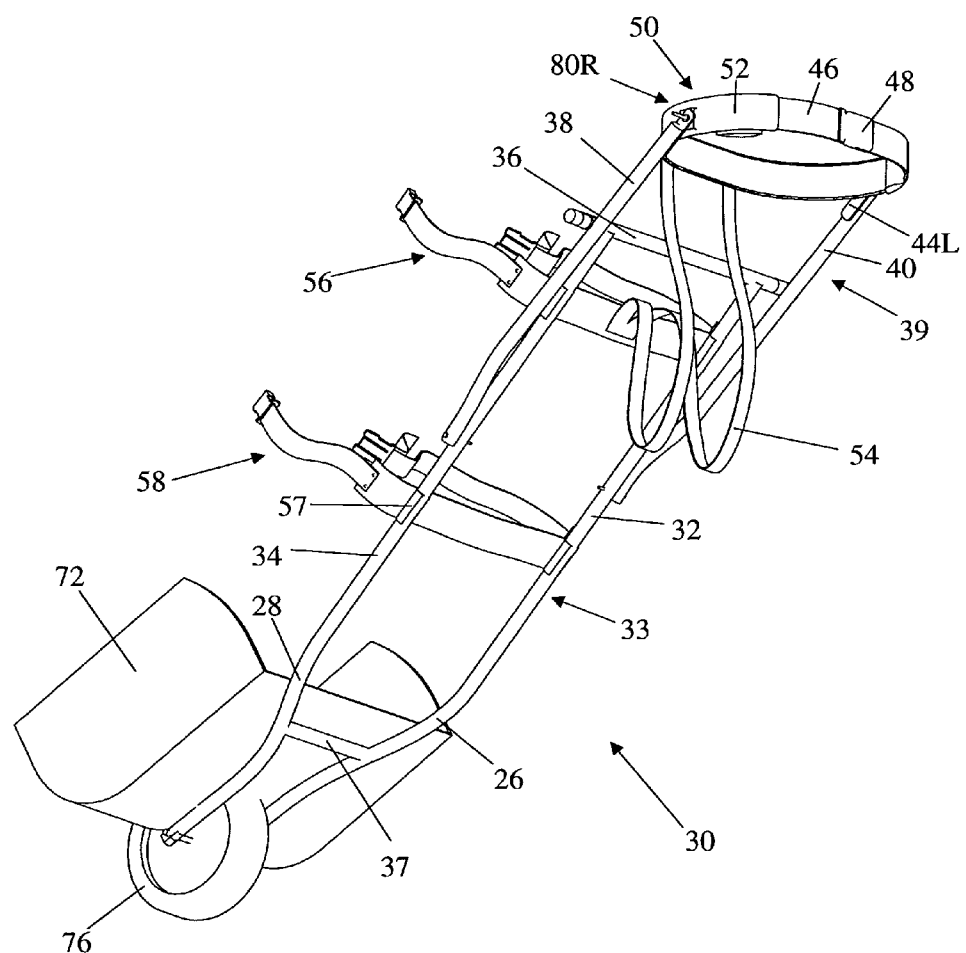
FIG. 2 shows a side front view of a carrier.

An embodiment is shown in FIGS. 1A, and 2. A wheeled carrier 30 is provided that is generally comprised of a frame 33, a user harness 50, a linkage 39, and a wheel 76. Frame 33 has a front end and a rear end and is comprised of side members 32 and 34 and a front cross member 36 located at the front end of frame 33 and a rear cross member 37 located at the rear end of frame 33. Frame 33 is pivotally connected at a predetermined location on side members 32 and 34 to the rear end of linkage 39 such that the front end of frame 33 rests on linkage 39 to form a support structure. The front end of linkage 39 is pivotally connected to user harness 50. Wheel 76 is rotatably attached to the rear end of frame 33.

Figure 5:
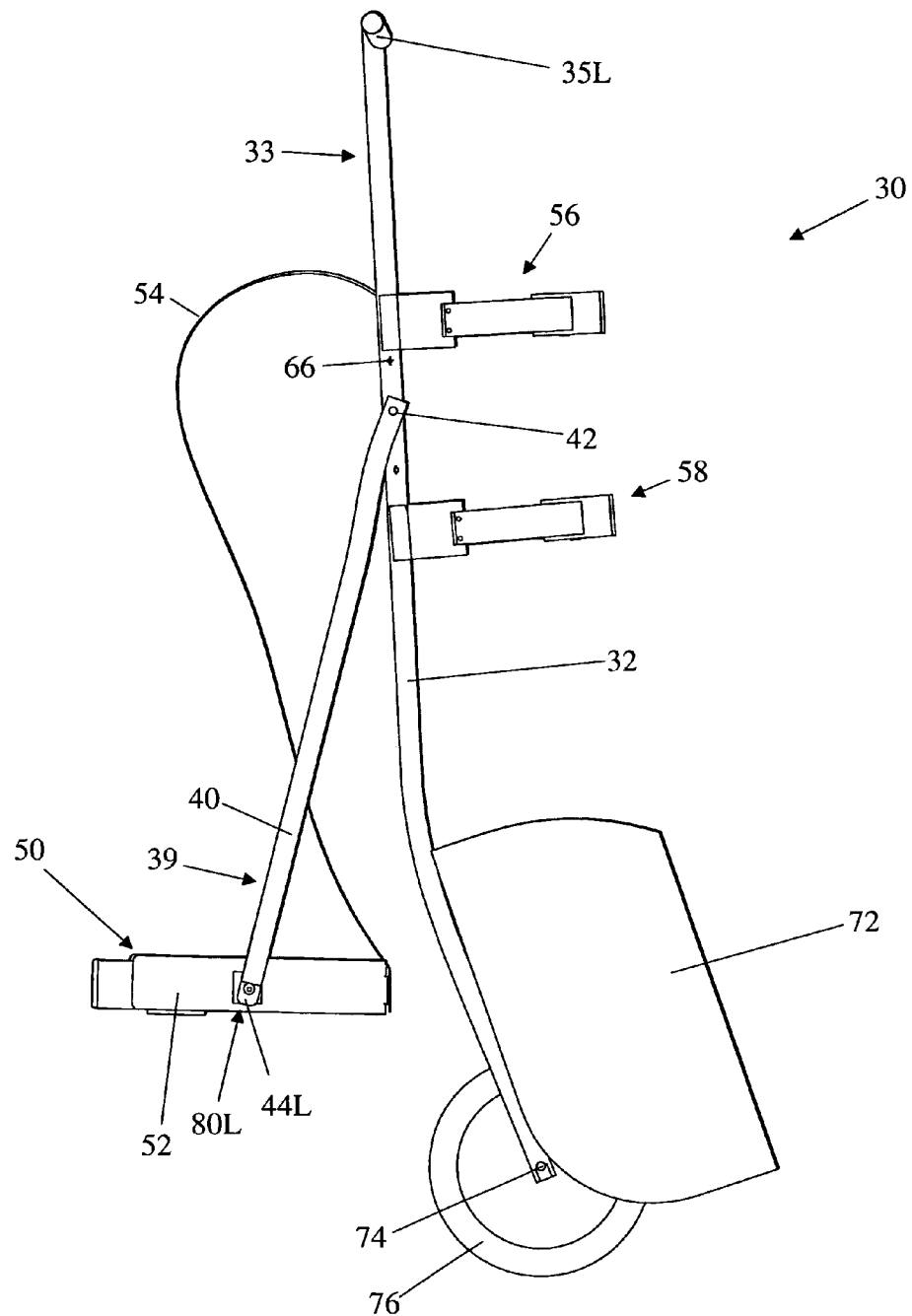
FIG. 5 shows a side view of the carrier in a position as it would be on the user's back

User harness 50 as shown in FIGS. 1A and 1B, has a hip belt 46 and a buckle 48 to secure belt 46 around the user. Buckle 48 is of the quick release type to allow easy and quick removal of carrier 30 in both the back carry position as shown in FIG. 5 and tow position as shown in FIG 1A. Belt 46 has a left hip pad 47L and a right hip pad 47R affixed to the inside surface. Pads 47L and 47R are made out of a flexible, resilient material such as gel padding or polyurethane foam. Pads 47L and 47R are fastened to belt 46 using hook and pile type fasteners to allow adjustment to the user's specific hip dimensions. Attached to harness 50 at the user's left side is a hitch mechanism 80L and at the user's right side is a hitch mechanism 80R. Hitch mechanism 80L and 80R can best seen in FIGS. 1A and 2. The material used in the construction of belt 46 is a lightweight flexible material such as nylon fabric. Additionally, belt 46 has a reinforcement member 52 near hitch mechanisms 80L and 80R to distribute the weight of the load applied to hitch mechanisms 80L and 80R around the user's waist. Reinforcement member 52 is attached to belt 46 using rivets and is constructed of semi-rigid plastic material. Belt 46 has an inner lining padded with polyurethane foam or like material to provide comfort to the user. Hitch mechanisms 80L and 80R are each comprised of a hitch base 84 and a hitch pivot 82 and are fastened to belt 46 at base 84 with suitable fasteners such as pop rivets, screws, and the like. Base 84 is generally a square shaped section of rigid material having pivot 82 protruding from it. The material of base 84 would be of sufficient strength for the application of supporting carrier 30 and could be of machined or ABS plastic, aluminum, or similar lightweight, high strength material. Pivot 82 is a shoulder bolt type fastener having a smooth shank and a threaded end. The material used in the construction of pivot 82 would be a high strength material such as corrosion resistant steel.

Figure 3:
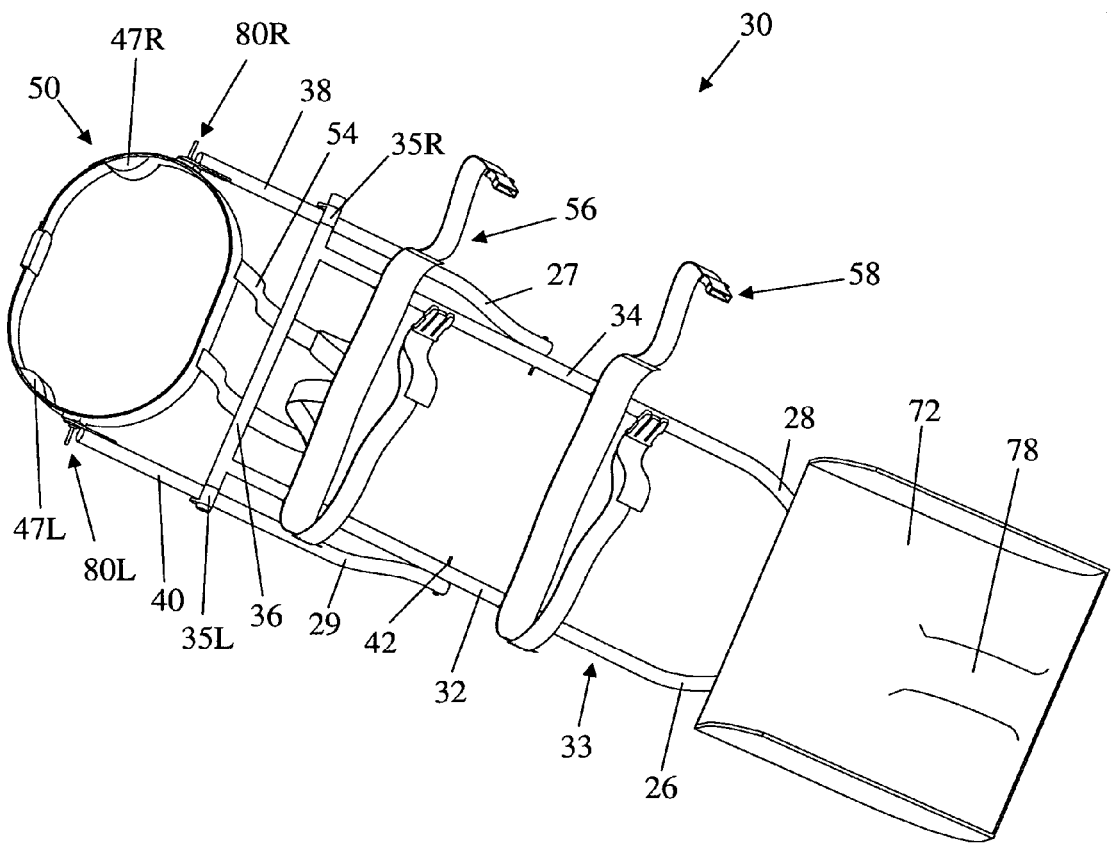
FIG. 3 shows a top view of a carrier.
Figure 4:
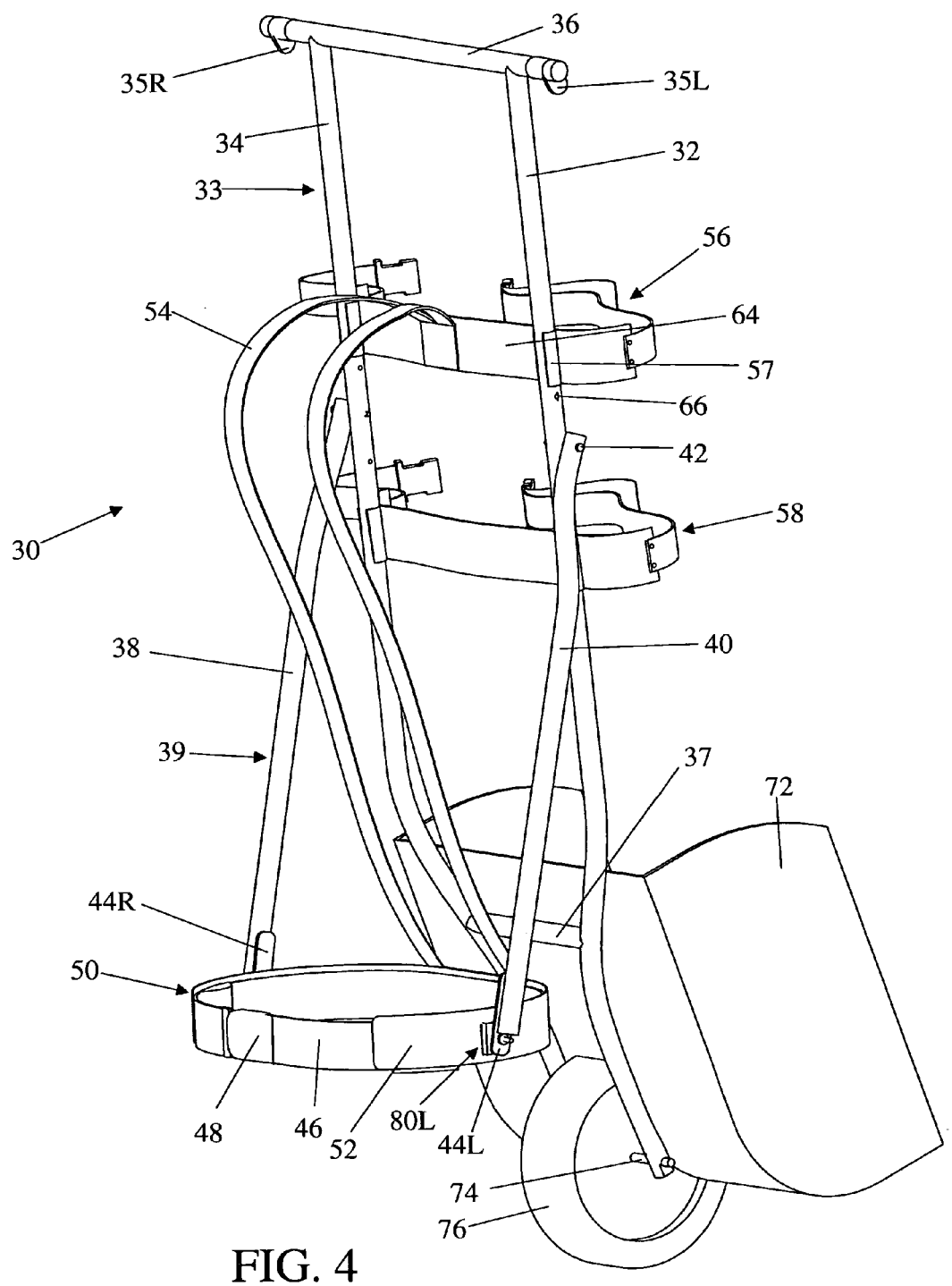
FIG. 4 shows a side-front view of the carrier in a position as it would be on the user's back.

As shown in FIGS. 1A and 4, linkage 39 is comprised of linkage members 38 and 40 and pivot mounts 44L and 44R. Linkage members 38 and 40 each have a front end and a rear end. The front ends of linkage members 38 and 40 are attached to pivot mounts 44R and 44L, respectively, using fasteners such as bolts. As shown in FIG. 1B, pivot mounts 44L and 44R are pivotally connected to pivots 82 on hitch mechanisms 80L and 80R, respectively. Pivot mounts 44L and 44R are each secured to pivots 82 by a fastener 86 such as a locknut. The rear ends of linkage member 38 and 40 are each pivotally attached to frame side members 34 and 32, respectively, at a predetermined location using a pin 42 such as a clevis pin or shoulder bolt. In the preferred embodiment, linkage members 38 and 40 are elongated structures made of high strength aluminum tubing. In the preferred embodiment, the distance between pivot 82 mounting point and pin 42 mounting point is 51 centimeters. Linkage members 38 and 40 may include several bent and angled sections. As shown in FIG. 3, first and second angled sections 27 and 29, respectively, are located at the rear of linkage members 38 and 40, respectively, and facilitate clearance of linkage 39 and the user when frame 33 is on the user's back as shown in FIGS. 4 and 5. Those of ordinary skill in the art will recognize that a variety of materials and construction methods are available for linkage members 38 and 40. Examples of other materials include strong and lightweight material such as ABS plastic tubing or rod, or graphite composite tubing, and titanium tubing. Examples of other possible construction methods for linkage members 38 and 40 include varying shapes or contours to match the contour of the user's back. Additionally, linkage members 38 and 40 could be made in a telescoping fashion to allow for length adjustment the benefits of which will become apparent.

As shown in FIGS. 1A and 2, frame 33 is generally comprised of side members 32 and 34, front cross member 36, and rear cross member 37. Frame side members 32 and 34 are joined at the front end of frame 33 by cross member 36 and at the rear end by cross member 37. The distance between side members 32 and 34 is 30 centimeters. Frame alignment guides 35L and 35R are attached at the ends of cross member 36 using fasteners such as screws. Frame side members 32 and 34 may include several bent and angled sections. As shown in FIG. 2, first and second angled sections 26 and 28 are located on side members 32 and 34, respectively, near rear cross member 37. Angled sections 26 and 28 facilitate mounting of wheel 76. As best shown in FIGS. 4 and 5, frame side members 32 and 34 have several alternate attachment holes 66 to accept pin 42 the benefits of which will be discussed later. In the preferred embodiment, side members 32 and 34 and cross members 36 and 37, are made of high strength aluminum tubing such as 7075-T6 aluminum alloy. Also, in the preferred embodiment the distance from cross member 36 to wheel 76 mounting point is 102 centimeters and the distance from cross member 36 to linkage 39 attachment point is 36 centimeters. Examples of other possible construction methods include, but are not limited to, multiple cross members to increase rigidity, cross members with varying shape or contour to match the contour of a user's back Also, a single piece of thermoformed or injection molded plastic could be used to form frame 33.

In the preferred embodiment, load-securing mechanisms 56 and 58 secure the load firmly to frame 33. As shown in FIG. 1A, load-securing mechanisms 56 and 58 are each comprised of a load support 64, a tie down strap 60 and a tie down strap 62, a female coupler 68 and a male coupler 70. Load-securing mechanisms 56 and 58 are attached to frame side member 32 and 34 using suitable fasteners such as bolts or screws. Load-securing mechanisms 56 and 58 can be attached at varying locations along frame side members 32 and 34 the benefit of which will become apparent. Load support 64 is an elongated structure several inches wide and made of thermoformed plastic or molded ABS plastic. As best seen in FIG. 4, support 64 has a frame interface 57 at each end to secure support 64 to frame side members 32 and 34. Load support 64 is of sufficient length to span the space between side members 32 and 34. Attached to one end of load support 64 is tie down strap 62 and attached to the opposite end of load support 64 is tie down strap 60. Tie down straps 60 and 62 are fastened to load supports 64 using suitable fasteners such as pop rivet, snap fasteners, and the like. Strap 62 has a male end coupler 70 secured to its end while strap 60 has a female coupler 68 secured to its end for mating with the respective male end coupler 70 on tie down strap 62. Male coupler 70 can be disengaged from female coupler 68 by merely squeezing coupler 70. Also, those of ordinary skill in the art will recognize that a variety of methods used to secure items to carrier 30 are available. Examples of other methods include, but are not limited to, tie down points attached to frame side members 32 and 34 at multiple locations for securing tie down straps or rope. Also, load-securing mechanisms 56 and 58 could be replaced with resilient web or open mesh fabric such as nylon that is attached to side members 32 and 34 and spanning the space between side members 32 and 34. Additionally, a gear pack made of a lightweight material such as nylon could be secured directly to frame 33 using snap fasteners or rivets such as a conventional pack is secured to an external pack frame.

As shown in FIG. 4, wheel 76 is rotatably mounted to the rear end of frame side members 32 and 34 in a conventional manner using an axle 74. In the preferred embodiment, wheel 76 is made of a single piece injection molded polyurethane. Those of ordinary skill in the art will recognize that a variety of methods can be used to secure wheel 76 to the rear end of frame side members 32 and 34 such as a removable wheel mounting.

In the preferred embodiment, a load basket 72 is affixed to the rear of frame 33 using suitable fasteners. As shown in FIG. 3, load basket 72 is approximately positioned over wheel 76 using a wheel well 78 to create a barrier between wheel 76 and contents of load basket 72. In the preferred embodiment load basket 72 is formed from thermoformed or injection molded plastic or the like. Those of ordinary skills in the art will recognize that frame 33 and load basket 72 could all be formed from a single piece of thermoformed plastic or injection molded structural foam or the like. Also, mounting axle 74 directly onto load basket 72 would be an alternate method of mounting wheel 76.

A pair of shoulder straps 54 as shown in FIGS. 3 and 4 has one end attached to load-securing mechanism 56 and the other end attached to belt reinforcement member 52. Having shoulder straps 54 attached to load-securing mechanism 56 allows the user to adjust the location of load-securing mechanism 56 on frame 33 to meet the user's preferred position when carrying the carrier 30 on the user's back as shown in FIG. 4. Those of ordinary skill in the art will recognize that a variety of methods and arrangements can be used to affix shoulder straps 54 to carrier 30.

OPERATION—PREFERRED EMBODIMENT

Carrier 30 as shown in FIG. 1A, allows the user to move carrier 30 in primarily 2 different ways. One way is when the user tows carrier 30 behind them in a hands-free fashion with wheel 76 on the ground as shown in FIG. 1A. The second way is with carrier 30 being carried on the user's back like a conventional backpack which is shown in FIG. 4. Additionally, carrier 30 can be switched from the tow configuration as shown in FIG. 1A to the back carry configuration as shown in FIG. 4 with ease and without removal from the user or disassembly of carrier 30. This switching between configurations is a benefit that all prior art is lacking.

The operation of carrier 30 being towed behind a user will be discussed first. A conventional backpack or duffel bag filled with equipment, hereafter referred to as the load, is set into load basket 72 and aligned onto load-securing mechanisms 56 and 58. Preferably the heavier items such as food and water are placed in load basket 72 or as close to wheel 76 as practical. Securing straps 60 and 62 secure the load to frame 33 by joining fastening mechanism 68 and 70. Harness 50 is placed around the user's waist and secured by fastened buckle 48 on belt 46. In the tow position, the downward force of the weight of the load on frame 33 keeps the front end of frame 33 in contact with linkage 39. In the tow position, linkage 39 supports the front end of frame 33. As the user walks over varying terrain, the rear end of frame 33 is supported by wheel 76 to easily tow carrier 30 behind the user with ease. As terrain obstacles such as holes, rocks, logs or the like, are walked over, frame 33 and linkage 39 pivot about hitch pivots 82 located on hitch mechanisms 80L and 80R and allows frame 33 to be raised and pulled over the obstacles. For bigger obstacles which are higher than wheel 76, frame 33 side members 32 and 34 will contact the obstacle causing frame 33 and linkage 39 to pivot about hitch pivots 82 and causing frame 33 to lift and be pulled over the obstacle as the user moves forward. Hip pads 47L and 47R cushion the contact surface between user harness 50 and the user's hips and reduce the amount of pulling force felt on the user's abdomen area. Being contained in load basket 72, items closest to the ground are protected from rocks, thorns and shrubs.

With the load being towed on carrier 30, a minimum of 60 percent of the load's weight is being supported by wheel 76 leaving the user's hips and legs to support the remaining weight. This weight distribution reduces the amount of energy used to transport the load when using carrier 30. The closer the center of gravity of the load is to wheel 76, the lower the weight of the load that the user must support. This fact shows that by moving frame 33 rearward away from the user such as by attaching linkage 39 closer to the front end of frame 33, the percentage of weight that the user supports is further reduced. This is accomplished by relocating linkage 39 attachment pin 42 to alternate holes 66 located on frame 33 side members 32 and 34. This position would be beneficial on terrain when the user would not expect to transfer loaded frame 33 to the user's back as discussed below. Linkage 39 performs several functions. First it functions as an extension to frame 33 by forming a rigid structure for carrying a load. Secondly it acts as an adjustable extension member to move frame 33 further away from the user to prevent interference of frame 33 with the user's stride while reducing the weight of the load the user must carry. Still further functions of linkage 39 will be discussed next. Using carrier 30 in the tow position reduces fatigue and increases comfort and freedom of motion for the user resulting in more enjoyment. Also, it will become apparent that the carrier can still perform as described on certain terrain such as snow and sand with wheel 76 removed.

As now discussed and shown in FIG. 4, carrier 30 can be transferred to the user's back and carried much like a conventional backpack. As the user comes to an obstacle such as a foot bridge or boulder field, the need to carry carrier 30 and the load secured to it like a conventional backpack becomes necessary. To transfer frame 33 to the user's back, the user grabs cross member 36 and supports frame 33 while the user squats. As the user squats down, linkage 39 pivots at its rear end about pin 42 and pivots at its front end about hitch pivots 82. In the squat position, the user pulls frame 33 forward and slides their arm through shoulder straps 54. The weight of the load is now transferred to hitch mechanisms 80L and 80R via linkage 39 and is supported by the user's hips. Reinforcement mechanism 52 distributes the weight of the load around the user's waist. Having hitch mechanisms 80L and 80R at the user's sides creates a more balanced loading on harness 50. Being in the correct posture for lifting carrier 30, the user can now stand upright and proceed over the obstacle with carrier 30 and load being carried on the user's back like a conventional backpack as shown in FIG. 4. The user may adjust shoulder straps 54 such that the weight of carrier 30 can be distributed between the user's shoulders and harness 50. The additional benefits of linkage 39 are that it allows frame 33 to easily translate to the user's back while transferring the weight of the load to harness 50. This translation is accomplished without removal of harness 50 and without disassembly of carrier 30. When the user wants to lower carrier 30 and load back to a tow position, the user squats and releases shoulder straps 54 from their arms and pushes frame 33 rearward until wheel 76 reaches the ground. As the user stands upright, linkage 39 pivots at its rear end about pin 42 and at its front end about hitch pivots 82 until frame cross member 36 comes to rest on linkage member 39. The user then continues walking with carrier 30 being towed behind them.

Carrier 30 can be adjusted to fit a variety of user unique dimensions such as height and waist dimensions. Spacers (not shown) can be added between frame 33 and linkage 39 at pin 42 interfaces to allow for a user with a larger waist. In addition, pivot mounts 44R and 44L can be shaped and bent for the same reason. Additional adjustments of carrier 30 include the length of carrier 30 as previously discussed and is accomplished by attaching the rear end of linkage 39 to alternate holes 66. In addition to moving frame 33 farther from the user and reducing the percentage of the load's weight the user supports, this adjustment also allows frame 33 to be carried at alternate heights on the user's back. Also, with one end of shoulder straps 54 attached to load-securing mechanism 56, mechanism 56 can be repositioned on frame 33 such that shoulder straps 54 are in a satisfactory position when carrier 30 is on the user's back.

ADDITIONAL EMBODIMENTS

Figure 6:
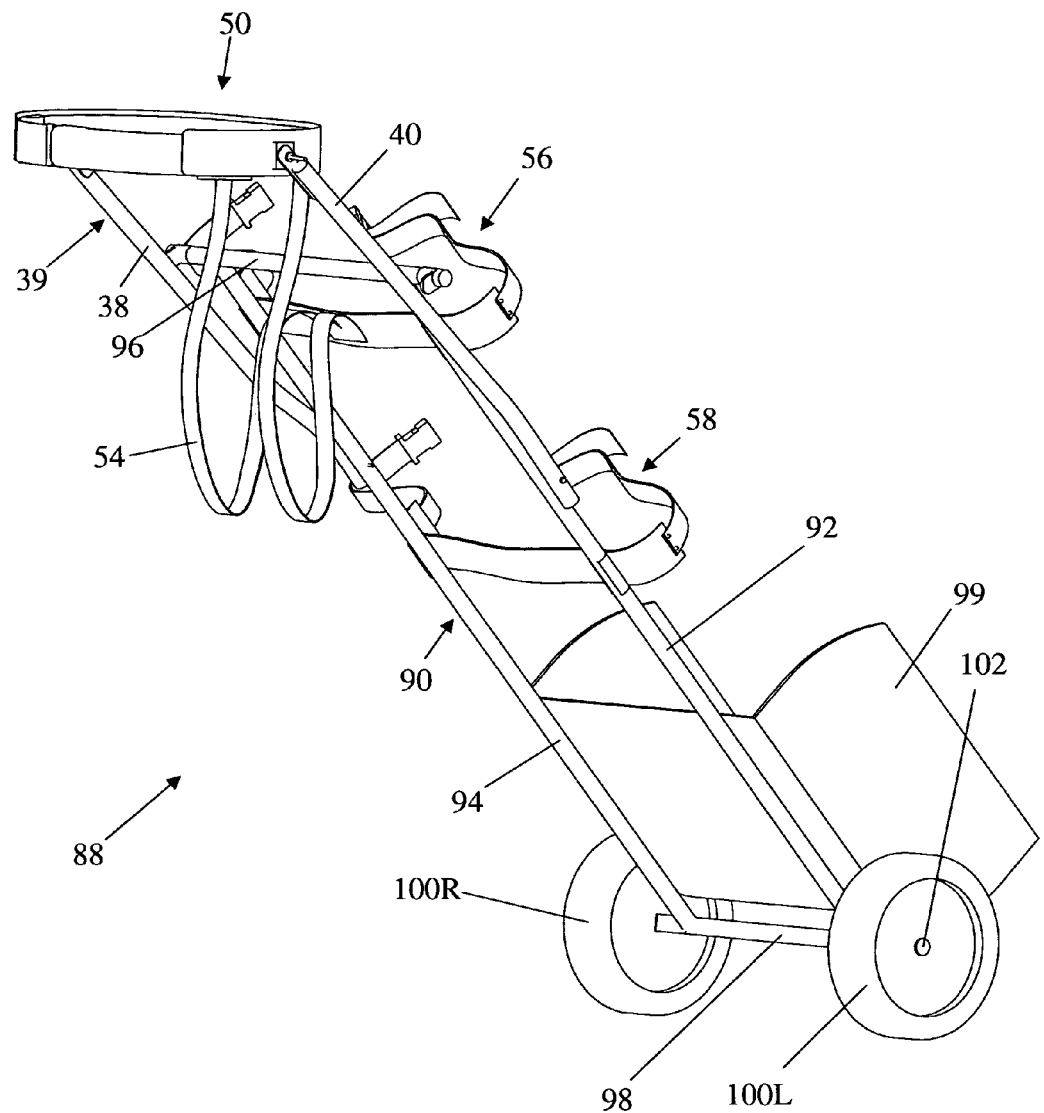
FIG. 6 shows a side-front view of a similar carrier having two wheels.
Figure 7:
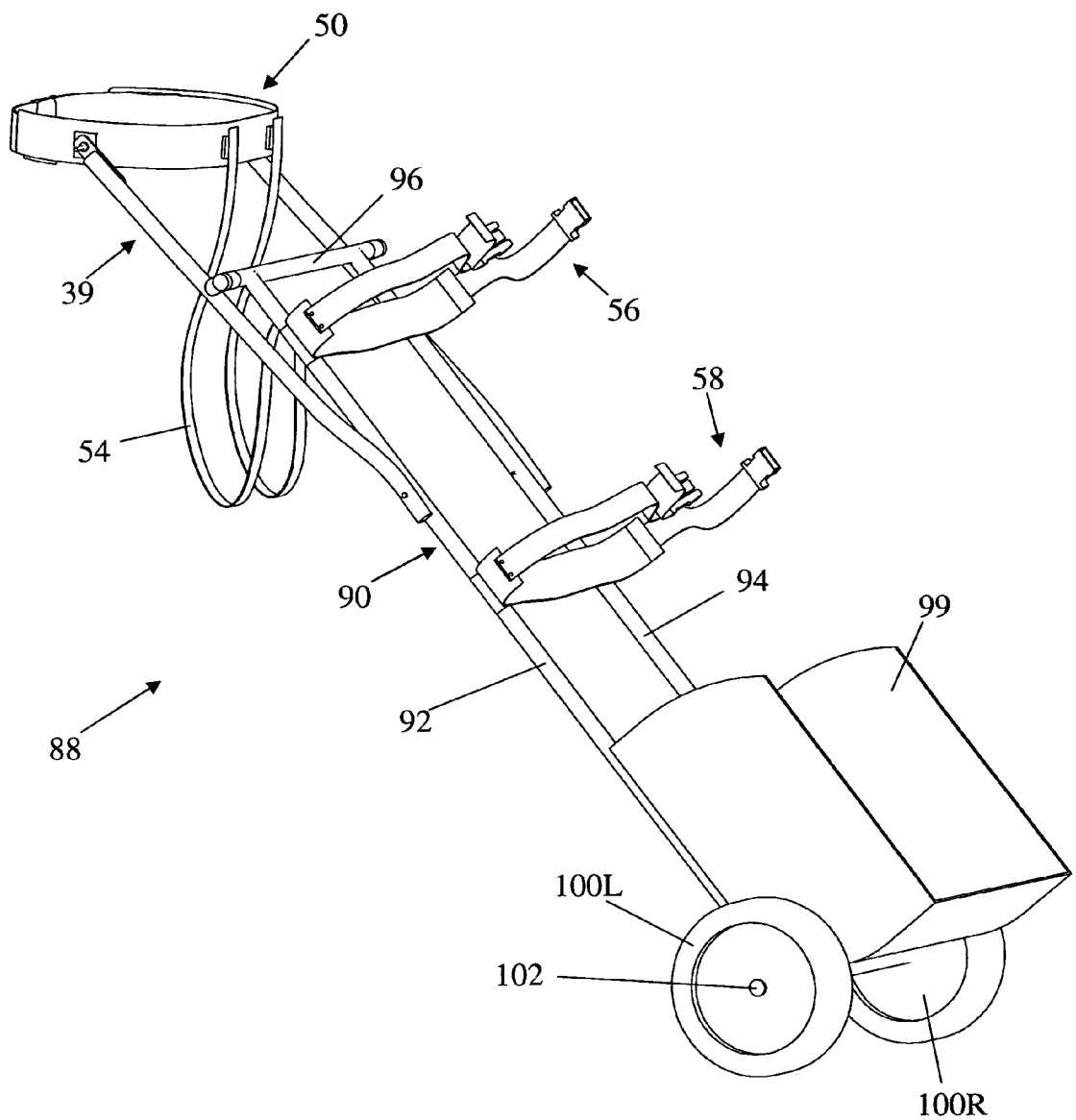
FIG. 7 shows a side-rear view of a similar carrier having two wheels.

Another embodiment is shown if FIGS. 6 and 7. A wheeled carrier 88 is provided that is generally comprised of a frame 90 and wheels 100L and 100R, along with the previously described user harness 50 and linkage 39. Frame 90 has a front end and a rear end and is comprised of side members 92 and 94 and a front cross member 96 located at the front of frame 90 and a rear cross member 98 located at the rear of frame 90. Frame 90 is pivotally connected at a predetermined location on side members 92 and 94 to the rear end of linkage 39 such that the front end of frame 90 rests on linkage 39 to form a support structure. The front end of linkage 39 is pivotally connected to user harness 50 as previously described. Cross member 98 functions as an axle for wheels 100L and 100R. Wheels 100L and 100R are each rotatably attached to the ends of cross member 98 using a bolt 102. Wheels 100L and 100R provide greater stability for frame 90 when frame 90 is loaded in an unbalanced manner. Frame 90 members 92, 94, 96 and 98 are generally straight sections of high strength aluminum tubing such as 7075-T6 aluminum alloy. Also, the distance from cross member 36 to wheel 76 mounting point is 102 centimeters and the distance from cross member 36 to linkage 39 attachment point is 36 centimeters. The distance between side members 92 and 94 is 30 centimeters. A load basket 99 is attached to the rear end of frame 90 using fasteners such as screws or rivets. The operation and benefits of carrier 88 are the same as the previously described carrier shown in FIG. 1A with wheels 100L and 100R providing greater stability for unbalanced loads. Wheels 100L and 100R can be space so as to straddle the user's waist when carrier 88 is carried on the user's back.

Another embodiment is the previously described carrier as shown in FIG. 1A without wheel 76. This embodiment would allow a user to carry items primarily on the user's back in a manner like a conventional backpack. The benefit of this embodiment is the user has a convenient way to mount and dismount frame 33 to and from their back as previously described. A known problem with conventional backpacks is the difficulty in putting them on your back. Typically, putting a backpack on requires the assistance of another person or requires the user to lie on the ground and roll into the pack and then get up. Additionally, the user could tow this embodiment behind them when conditions warrant it such as terrain covered with snow, ice, or sand. Load basket 72 would function as a ski in these conditions by providing support for frame 33 while protecting items being transported.

DESCRIPTION—FIRST ALTERNATIVE EMBODIMENT

Figure 8:
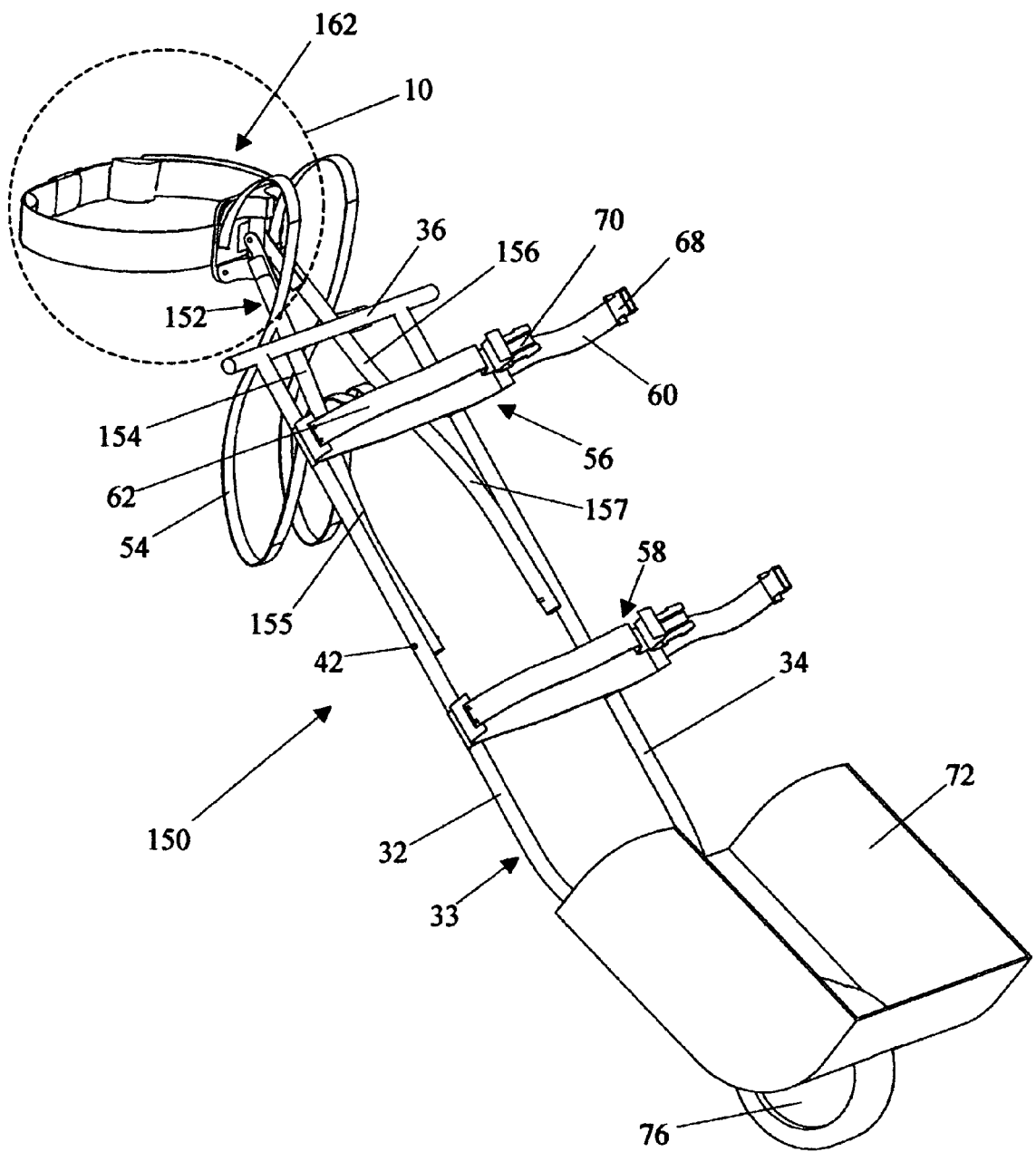
FIG. 8 shows a side-rear view of a carrier with an alternate user harness that has a rear mounted hitch.
Figure 9:
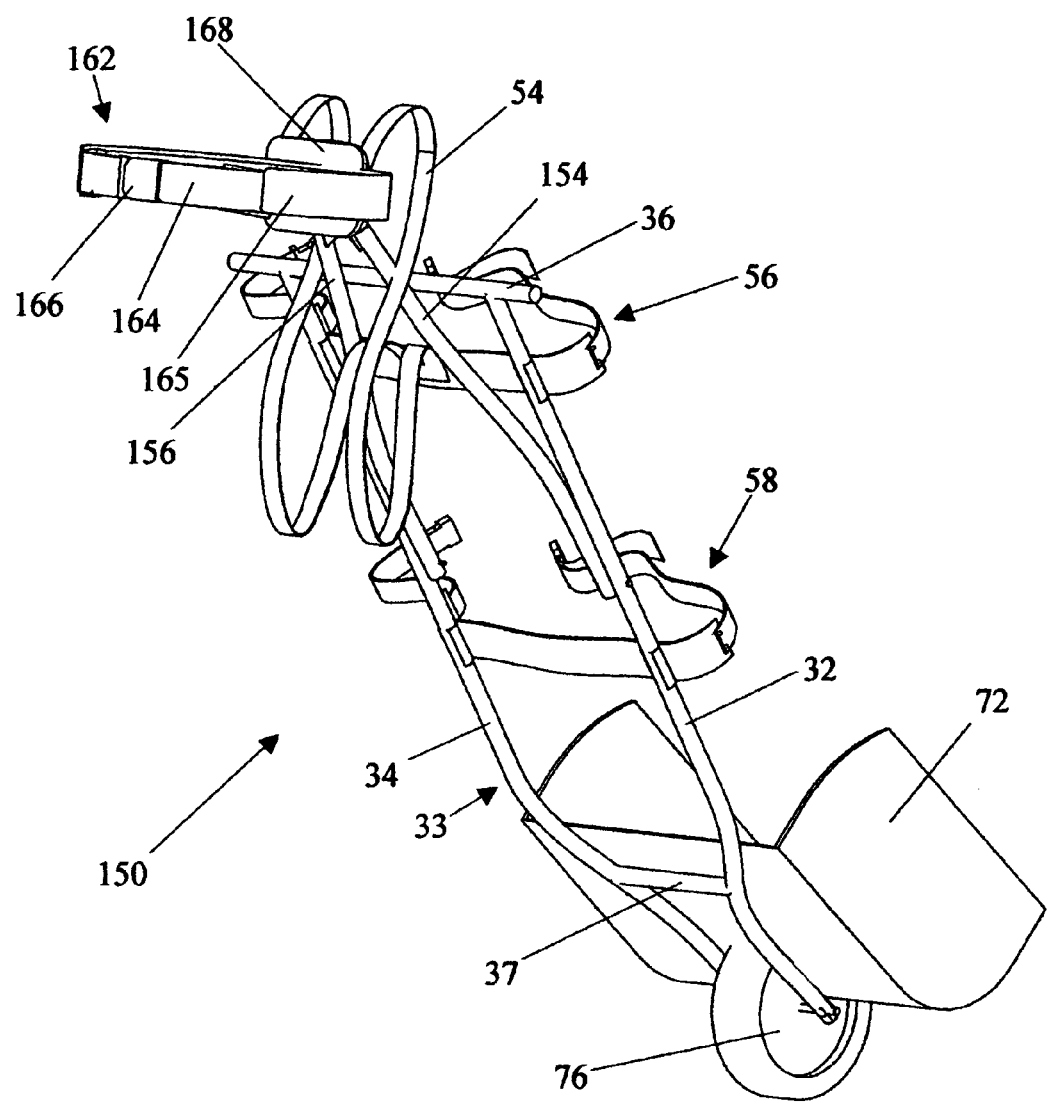
FIG. 9 shows a front-side view of a carrier with an alternate user harness that has a rear mounted hitch.
Figure 10:
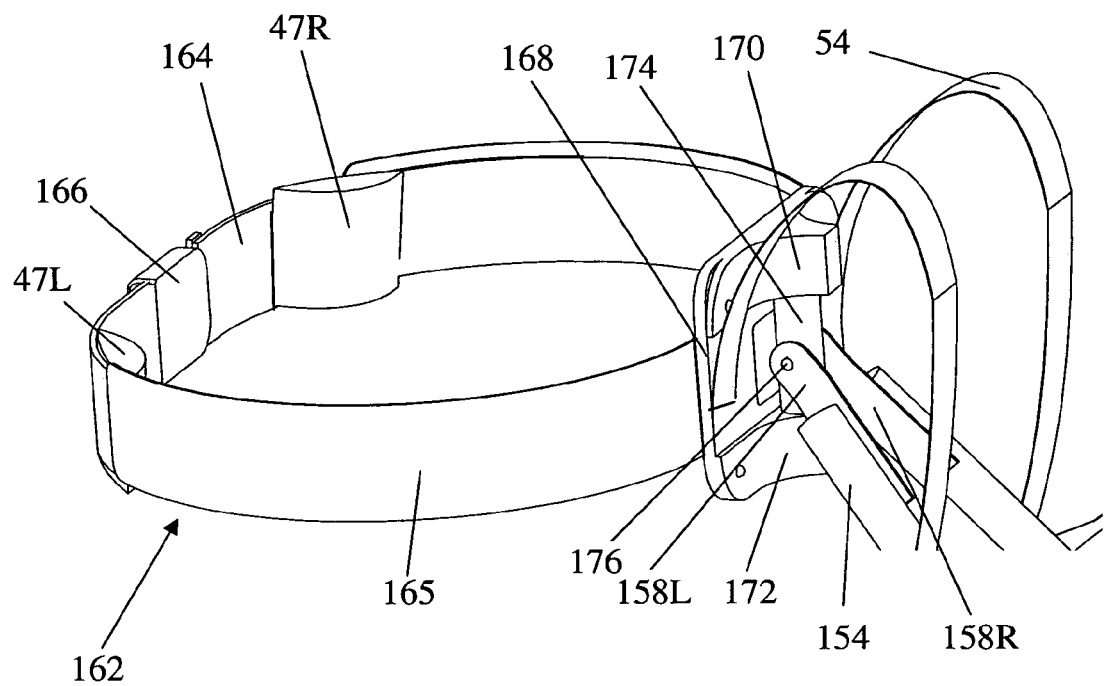
FIG. 10 shows a close-up of alternate user harness that has a rear mounted hitch.

Another embodiment is shown in FIGS. 8 and 9. A wheeled carrier 150 is provided that is generally comprised of a user harness 162, a linkage 152 and the previously discussed frame 33 and wheel 76. Frame 33 is pivotally connected at a predetermined location on side members 32 and 34 to the rear end of linkage 152 such that the front end of frame 33 rests on linkage 152 to form a support structure. The front end of linkage 152 is pivotally connected to user harness 162. Wheel 76 is rotatably attached to the rear end of frame 33 as previously described User harness 162 is shown in detail in FIG. 10. User harness 162 is comprised of a hip belt 164 with a buckle 162 to secure belt 164 around the user's waist. Buckle 166 is of the quick release type to allow easy and quick removal of carrier 150 from the user. Pads 47L and 47R are attached to belt 164 using hook and pile fasteners as previously discussed. Belt 164 has a reinforcement member 165 to distribute the weight of the load around the user's waist. Reinforcement member 165 is attached to belt 102 from the user's hips and around the user's waist using fasteners such as rivets and is constructed of a semi-rigid material such as plastic. The material used in the construction of belt 164 is a lightweight flexible material such as canvas or nylon fabric. Belt 164 has an inner lining padded with polyurethane foam or a like material to provide comfort to the user's hips. Belt 164 is fastened at the user's backside to a hitch base 168 using fasteners such as screws. A hitch pivot 174 is pivotally attached to base 168 by an upper pivot support 170 and a lower pivot support 172. Pivot supports 170 and 172 are attached to base 168 with fasteners such as screws or rivets.

As shown in FIGS. 8 and 9, linkage 152 is comprised of linkage members 154 and 156 and pivot mounts 158L and 158R. Linkage members 154 and 156 have a front end and a rear end. The front end of linkage members 154 and 156 are attached to pivot mounts 158L and 158R, respectively, using fasteners such as bolts. Pivot mounts 158L and 158R are pivotally attached to hitch pivot 174 using a fastener 176 such as a shoulder bolt. The rear end of linkage members 154 and 156 are each pivotally attached to flame side members 34 and 32, respectively, at a specified location with fastener 42 as previously discussed. Linkage members 154 and 156 are made of high strength aluminum tubing and the distance from fastener 42 pivot axis to pin 42 pivot axis is 43 centimeters. Linkage members 154 and 156 may include several bent and angled sections. As shown in FIG. 8, linkage members 154 and 156 have angled sections 155 and 157, respectively, and facilitate mounting of frame 33 to linkage 152. Those of ordinary skill in the art will recognize that a variety of materials and construction are available for linkage members 154 and 156. Examples of other materials include strong and lightweight material such as ABS plastic tube or rod, or graphite composite tube, and titanium tubing. Examples of other possible construction methods include, but are not limited to, multiple cross members, cross members and side members with varying shapes or contours to match the contour of a user's back. Also, linkage 152 could be formed from a single piece of thermoformed plastic.

Figure 11:
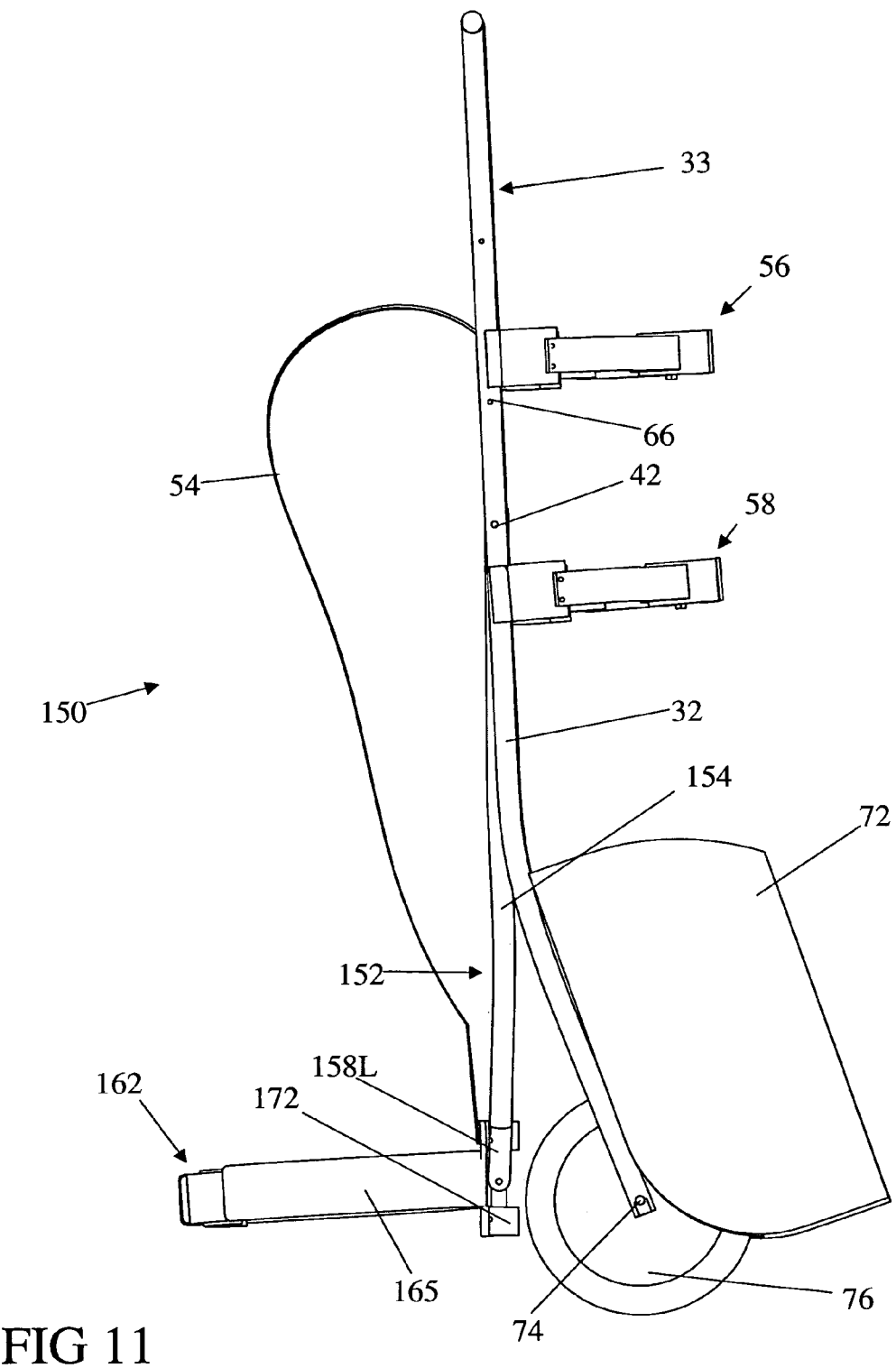
FIG. 11 shows a side view of the carrier with an alternate user harness that has a rear mounted hitch.
Figure 12:
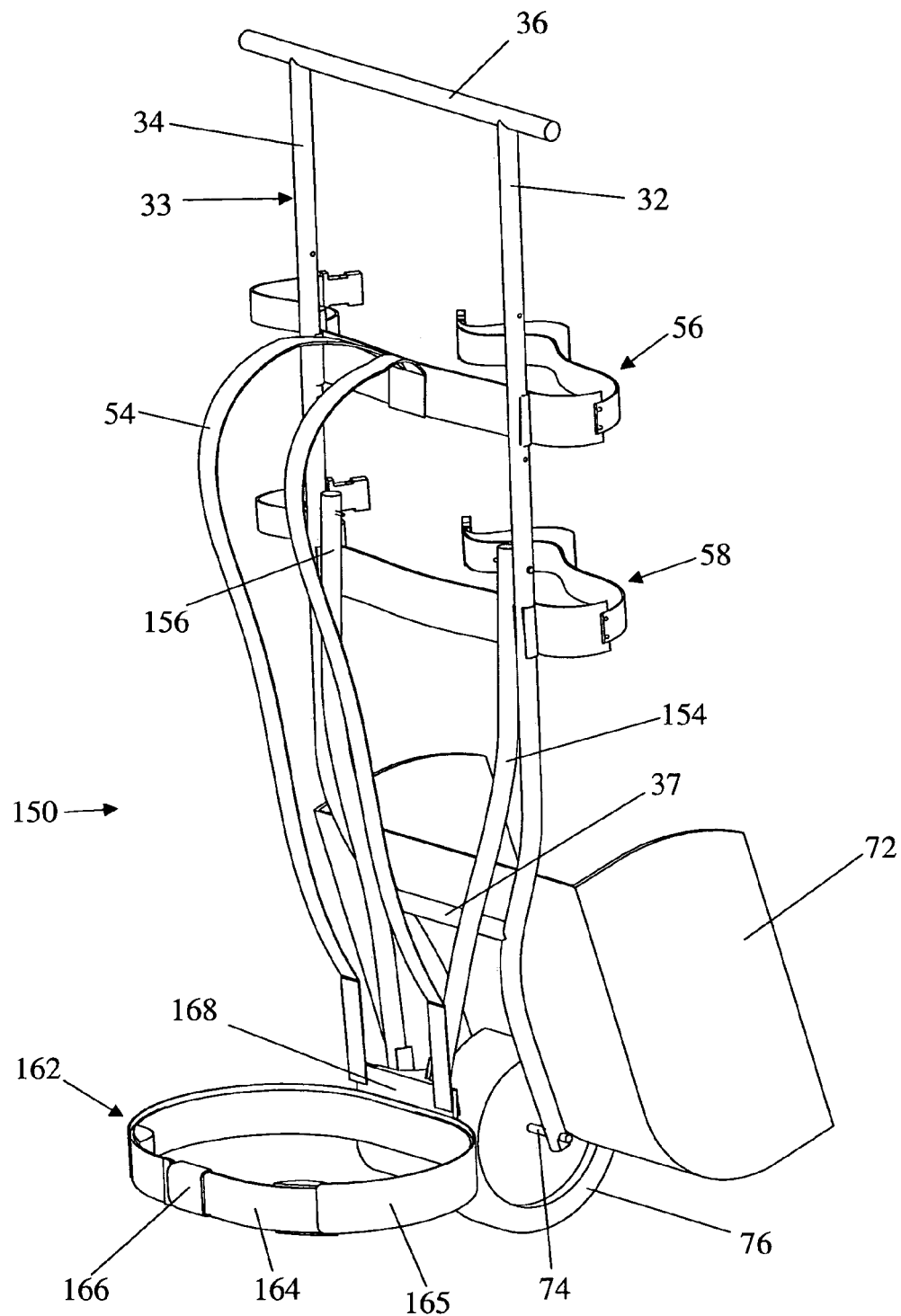
FIG. 12 shows front-side view of the carrier with a rear mounted hitch in a position as it would be on the user's back.

Shoulder straps 54 as shown in FIGS. 11 and 12 are attached to load securing mechanism 56 and lower pivot support 172. Those of ordinary skill in the art will recognize that a variety of methods and arrangements can be used to affix shoulder straps 54 to carrier 150. Some of these include fastening shoulder straps 54 to linkage mechanisms 154 and 156, or attaching straps 54 directly to belt structure 164.

OPERATION—FIRST ALTERNATE EMBODIMENT

Carrier 150 as shown in FIGS. 8 and 9 allows the user to transport items on frame 33 in primarily 2 different ways as discussed previously. This embodiment has several benefits for the user that all prior art is lacking. In addition to the ability to transfer frame 33 to the user's back easily and without removal of carrier 150 from the user as previously discussed, the user now has the ability to turn left and right while still attached to carrier 150. This is a benefit when navigating trails with tight bends.

A conventional backpack or duffel bag filled with equipment, hereafter referred to as the load, is placed on frame 33 and secured as previously discussed. Harness 162 is placed around the user's waist and fastened using buckle 166. In the tow position the front end of frame 33 is supported by linkage 152 with the rear end of frame 33 being supported by wheel 76 as previously discussed. As the user walks over varying terrain, frame 33 is supported by wheel 76 to easily tow carrier 150 behind the user. As terrain obstacles such as holes, rocks, logs or the like, are walked over, frame 33 and linkage 152 pivot about hitch pin 176 and allows frame 33 to be raised and pulled over the obstacles. For bigger obstacles that are higher than wheel 76, frame 33 side members 32 and 34 will contact the obstacle causing frame 33 to lift and be pulled over the obstacle as the user moves forward. Lateral turning to the left and right by the user when towing carrier 150 occurs as hitch pivot 174 rotates inside pivot supports 170 and 172. This feature allows the user to turn easily when towing carrier 150 as shown in FIG. 8. Sufficient clearance allows hitch pivot 174 to rotate freely a minimum of 45 degrees to either side. Due to the reduced distance between centerline of hitch pivot 174 and base 168, the torque or moment caused by the weight of the load on the base 168 is significantly reduced. The transfer of carrier 150 to the user's back is accomplished as previously discussed.

DESCRIPTION—ADDITIONAL EMBODIMENTS

Figure 13:
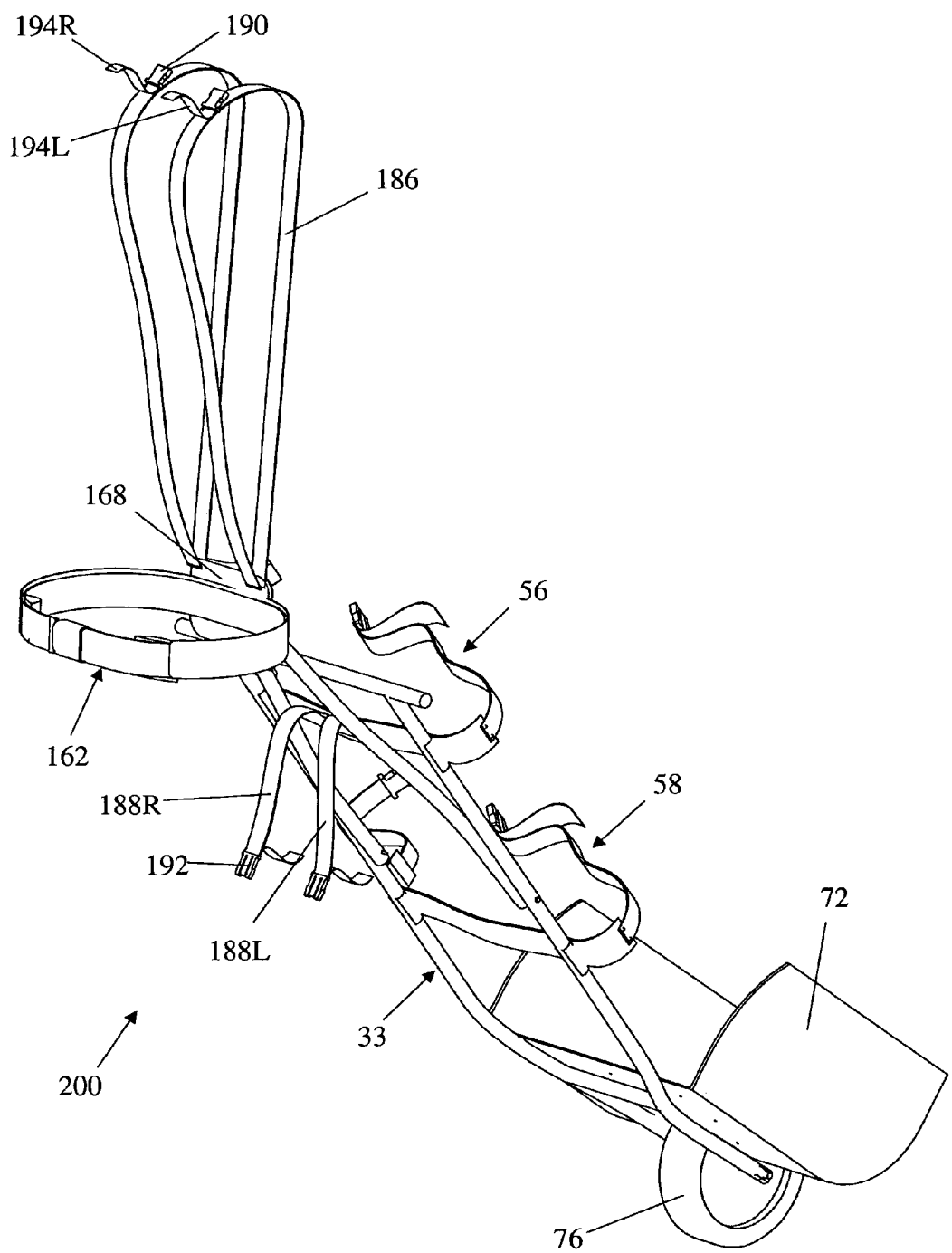
FIG. 13 shows carrier with rear hitch and alternate shoulder harness.
Figure 14:
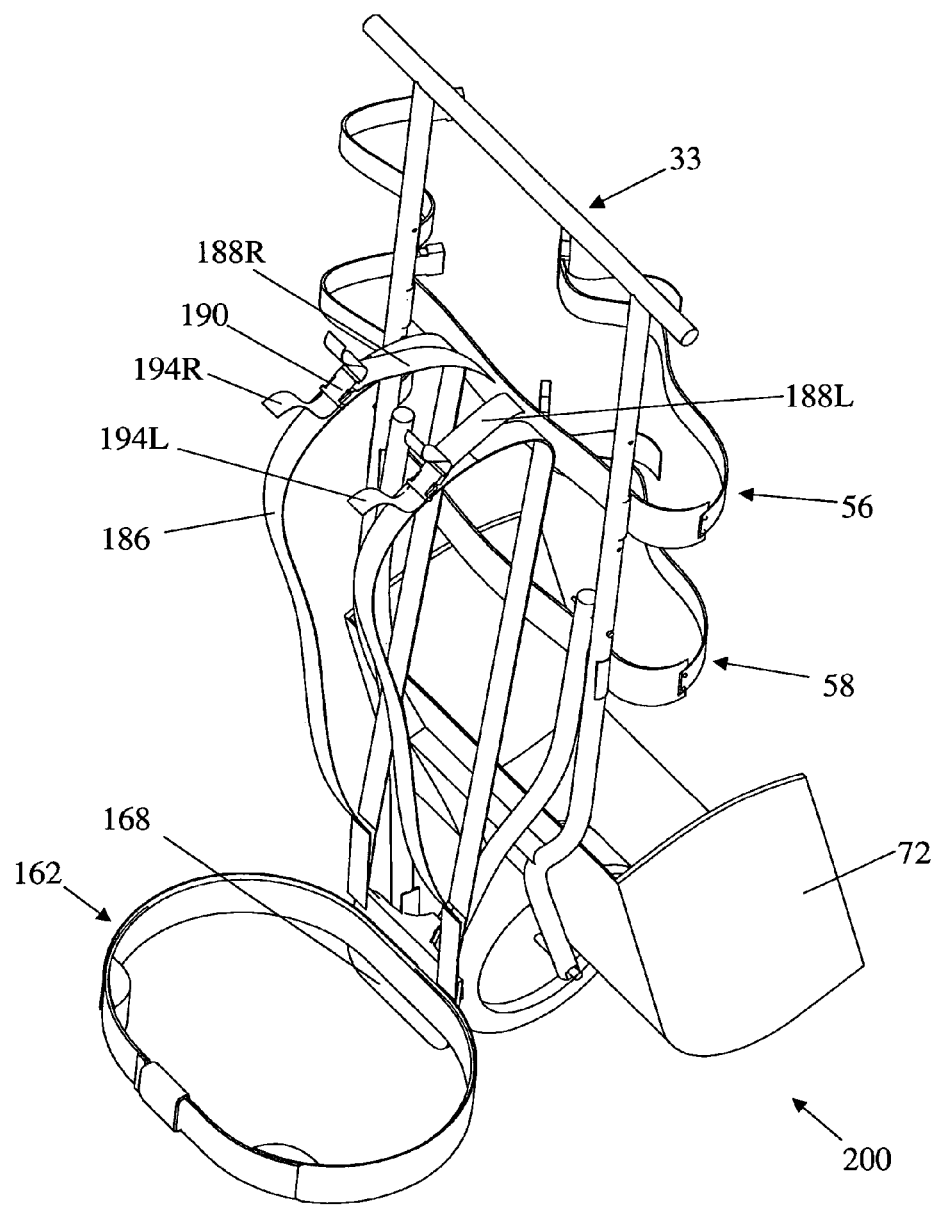
FIG. 14 shows carrier with rear hitch and alternate shoulder harness is a position as it would be on the user's back.
Figure 15:
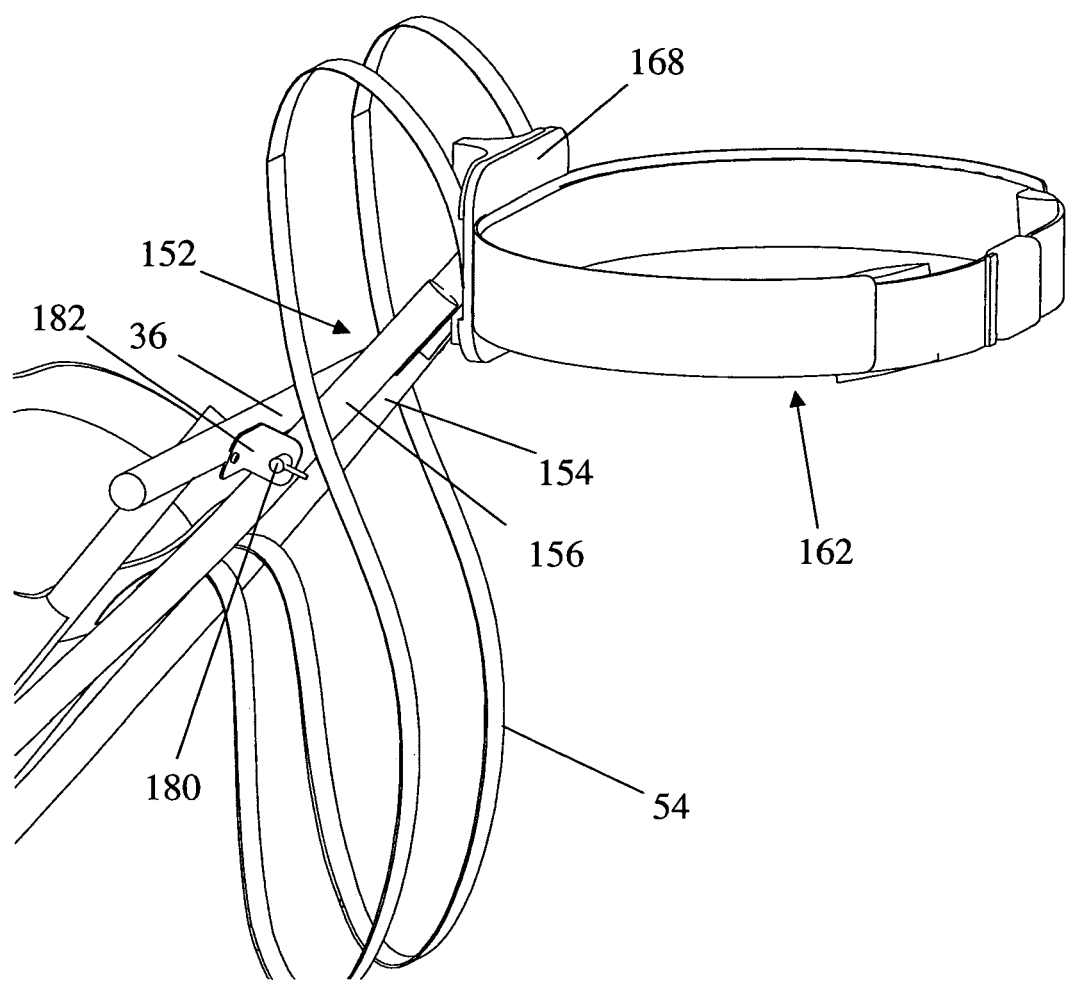
FIG. 15 shows similar carrier with a rear mount hitch with quick release pin to lock frame to linkage.

Yet another embodiment is shown in FIGS. 13 and 14. A wheeled carrier 200 is provided having a shoulder harness 186 attached to hitch base 168. The attachment method of shoulder harness 186 to base 168 is by screw type fasteners. Attached to shoulder harness 186 in the area of the user's shoulders is a left and a right securing strap 194L and 194R, respectively. On each securing strap 194L and 194R is female fastening mechanism 190. Attached to load support 56 is a left and a right securing strap 188L and 188R, respectively. At the end of each securing strap 188 is a male fastening mechanisms 192. The lengths of securing straps 188L and 188R and securing straps 194L and 194R are adjustable to allow for differences in the user's dimensions. Those skilled in the art will recognize that shoulder straps 186 could be fastened to base 186 or to belt 164 using rivets, stitching, etc. The user wears shoulder harness 186 when using carrier 200 in both the back carry position as shown in FIG. 15 and tow position as shown in FIGS. 13 and 14. Wearing shoulder harness 186 in both positions allows the weight of the load to be distributed between the hips and shoulders at the user's discretion. When carrier 200 is transferred to the back carry position as previously discussed, securing straps 188L and 188R are fastened to securing strap 194L and 194R using fastening mechanisms 190 and 192. Straps 194L and 194R then tighten carrier 200 to the user's back. When lowered back to the tow position, fastening mechanism 190 and 192 are released allowing carrier 200 to drop from the user's back.

Figure 21:
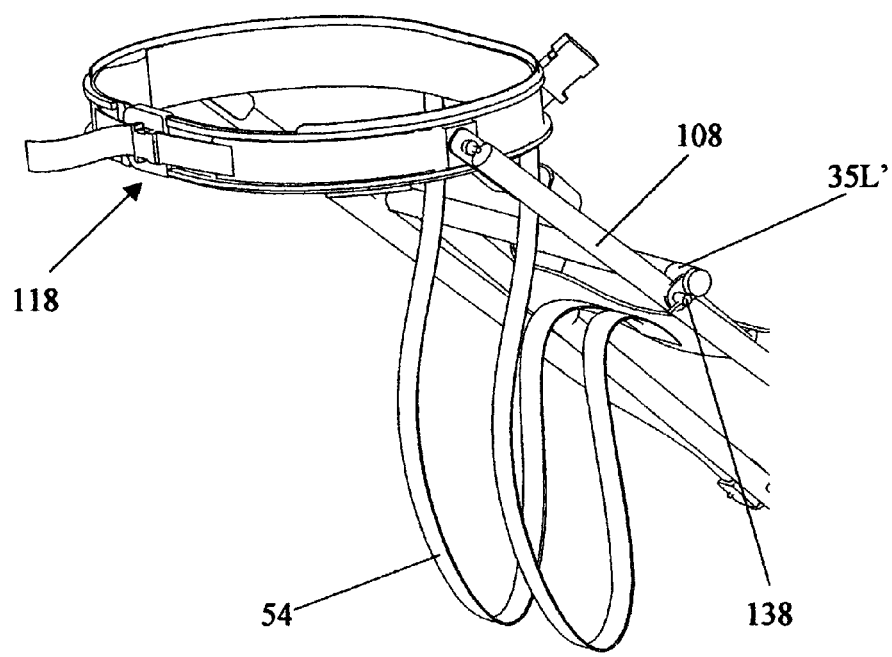
FIG. 21 shows an alternate configuration of the carrier having the slip belt harness with a quick release pin locking the linkage to the frame.

Another embodiment is shown in FIG. 21. This embodiment is similar to the one shown in FIG. 8 with the addition of a quick release pin 180 to secure frame 33 to linkage 152. An angle bracket 182 is secured to cross member 36 and is adapted to receive pin 180. Pin 180 is inserted through bracket 182 and linkage member 154. In this configuration, frame 33 is fastened to linkage 152 such that linkage 152 and frame 33 form a rigid support structure. The operation of this embodiment is similar to the one shown in FIG. 8 with the exception that pin 180 needs to be removed by the user prior to transferring frame 33 on the user's back. This embodiment with a rigid frame has several benefits over prior art having rigid frame. The benefits being the embodiment allows the user to turn easily to navigate trails and also the load is carried completely on the user's hips which frees up the user's back which increases safety, enjoyment and comfort to the user during travel.

Another embodiment is comprised of the previously described user harness 162 and linkage 152 as shown in FIG. 8 and the previously described frame 90, wheels 100L and 100R, load securing mechanisms 56 and 58, and load basket 99 as shown in FIG. 6. Frame 90 is pivotally connected at a predetermined location on side members 84 and 85 to the rear end of linkage 152 such that the front end of frame 90 rests on linkage 152 to form a support structure. The operation and benefits of this embodiment are the same as the previously described embodiment shown in FIG. 8 with wheels 100L and 100R providing greater stability for unbalanced loads.

Another embodiment is the previously described carrier as shown in FIG. 8 without wheel 76 mounted to frame 33. This embodiment would allow a user to carry items primarily on the user's back in a manner like a conventional backpack. The benefit of this embodiment is the user has a convenient way to mount and dismount the load to and from their back. Additionally, the user could tow this embodiment behind them when conditions warrant it such as terrain covered with snow, ice, or sand. Load basket 99 would function as a ski in these conditions by providing support for frame 33 on the terrain while protecting the items being transported.

DESCRIPTION—SECOND ALTERNATIVE EMBODIMENT

Figure 16:
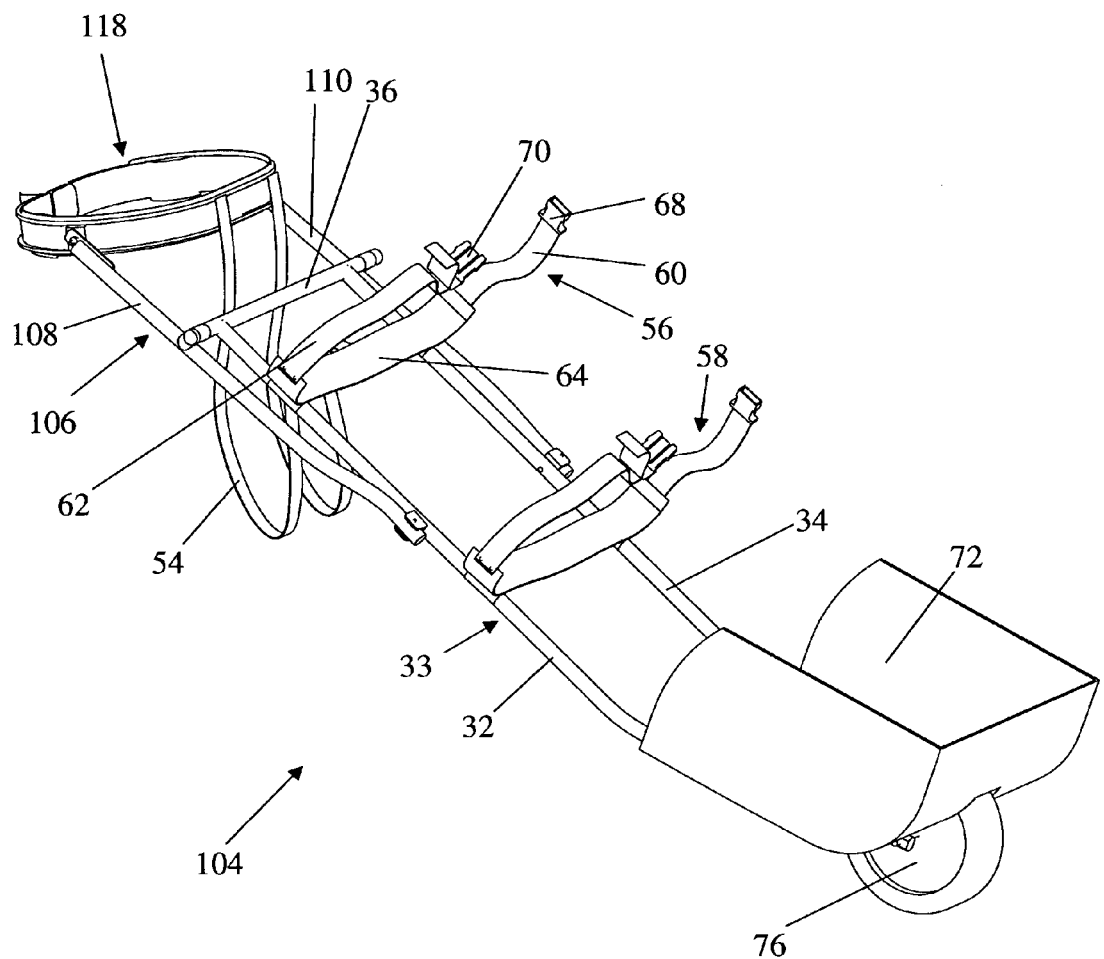
FIG. 16 shows carrier with an alternate user harness having a slip belt

Another embodiment is shown in FIG. 16. A wheeled carrier 104 is provided that generally has frame 33, a user harness 118, a linkage 106, and wheel 76. Frame 33 is pivotally connected at a predetermined location on side members 32 and 34 to the rear end of linkage 106 such that the front end of frame 33 rests on linkage 106 to form a support structure. The front end of linkage 106 is pivotally connected to user harness 118. Wheel 76 is rotatably attached to the rear end of frame 33 as previously described.

Figure 20A:
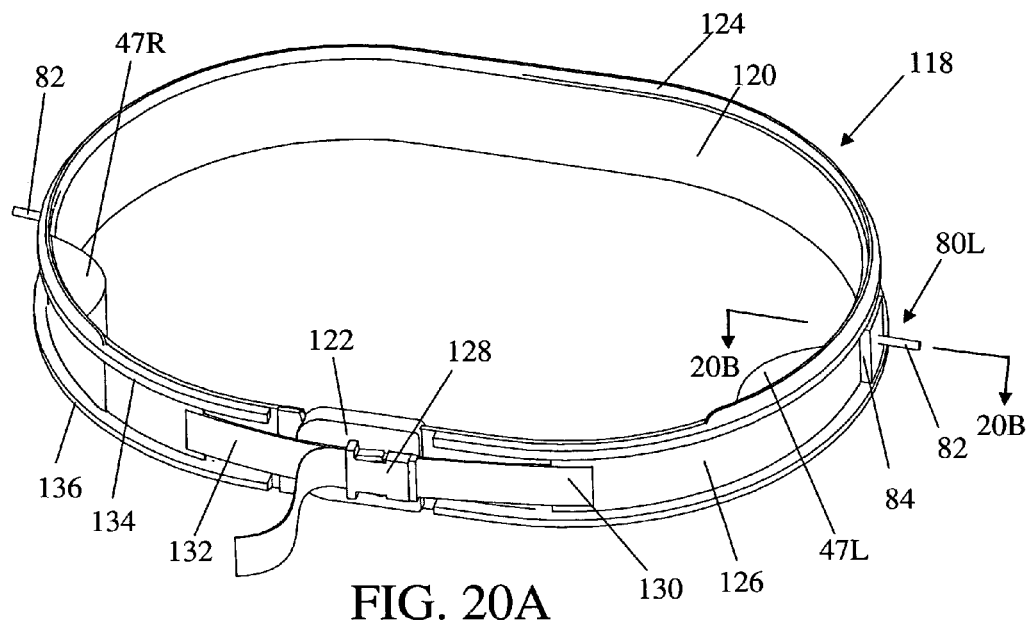
FIG. 20A shows a detailed view of the slip-belt harness.
Figure 20B:
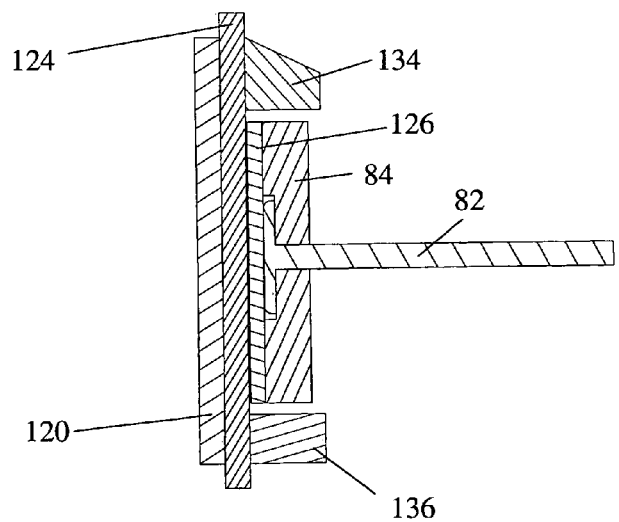
FIG. 20B shows a cross section of the hitch mechanism of the slip belt harness.

User harness 118 as shown in FIGS. 20A and 20B is comprised of an inner waist belt 120 and an outer slide belt 126. Belt 120 has a buckle 122 to secure belt 120 around the user's waist. Pads 47L and 47R are attached to inner belt 120 using hook and pile fasteners as previously discussed. Additionally, belt 120 has a reinforcement member 124 to distribute the weight of the load around the user's waist. Reinforcement member 124 is attached to belt 120 from the user's hips and around the user's waist using fasteners such as rivets and is constructed of semi-rigid plastic material. An upper track guide 134 and a lower track guide 136 are secured to reinforcement member 124 and inner belt 120 from buckle 122 and around the user's waist using fasteners such as rivets. Upper and lower track guides 134 and 136 are made of a semi-rigid material such as plastic. Inner waist belt 120 can be made out of a lightweight material such as nylon and has a padded inner lining of soft material such as polyurethane foam. Outer slide belt 126 would be made from a sheet plastic material such as PTFE, polypropylene or even nylon with thin PTFE backing. Outer belt 126 is attached to a buckle 128 via flexible extensions 130 and 132. Hitch mechanisms 80L and 80R are fastened to slide belt 126 at the left and right sides of user harness 118 and are best seen in FIGS. 20A and 20B. The sliding surface between inner belt 120 and outer belt 126 is smooth to decrease sliding friction.

Figures 19A, 19B:
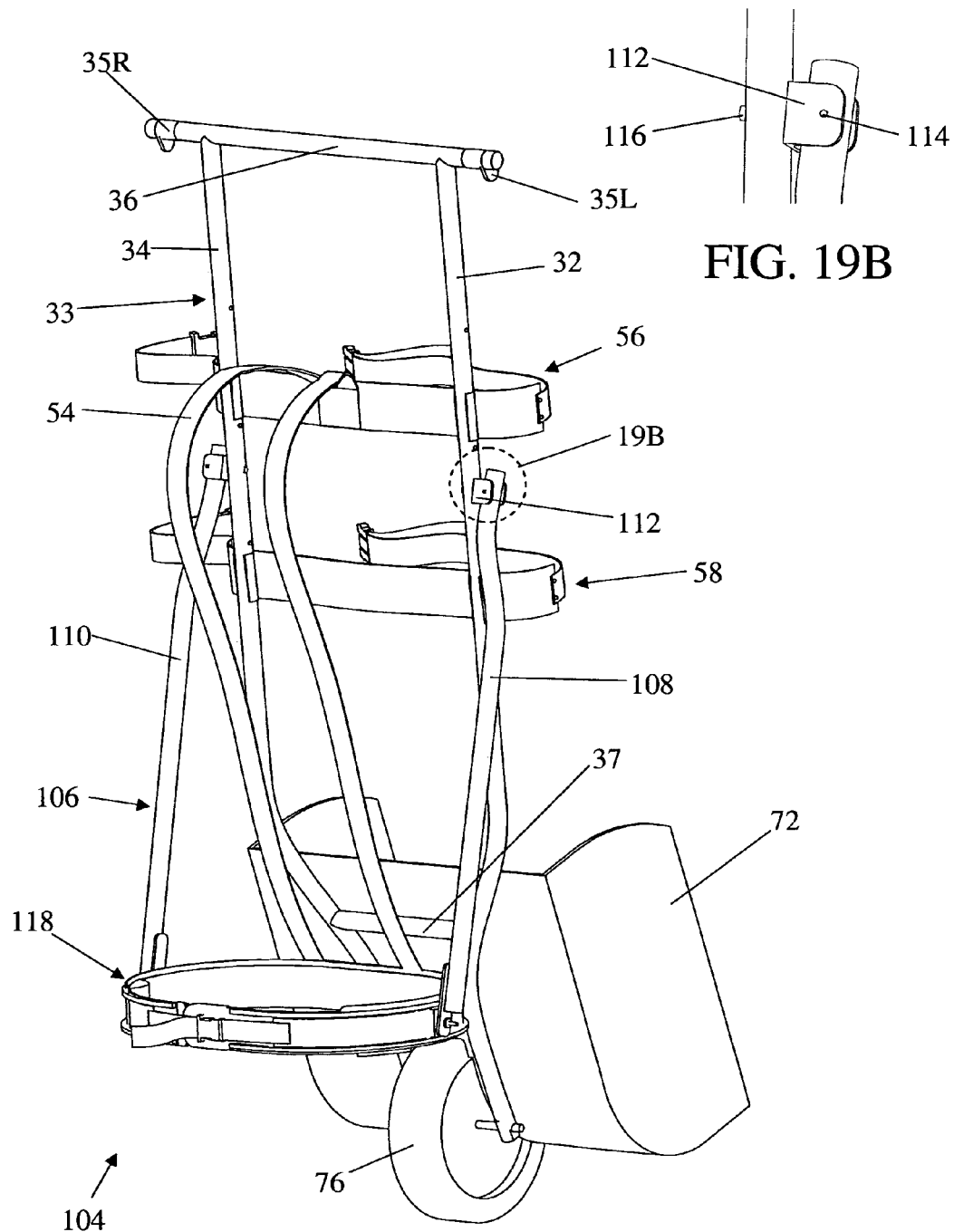
FIG. 19A shows front-side view of carrier with slip belt harness in a position as it would be on the user's back.
FIG. 19B shows a close-up of a clevis attachment point.

As shown in FIGS. 16 and 19A, linkage 106 is comprised of linkage members 108 and 110 and pivot mounts 44L and 44R. Linkage members 108 and 110 each have a front end and a rear end. The front ends of linkage members 108 and 110 are attached to pivot mounts 44R and 44L, respectively, using fasteners such as bolts. Pivot mounts 44L and 44R are pivotally connected to pivots 82 on hitch mechanisms 80L and 80R, respectively, as previously discussed. The rear end of linkage member 108 and 110 are each pivotally attached to a clevis 112 using a pin 114 such as a shoulder bolt or clevis pin. Clevis 112 is best seen in FIGS. 19A and 19B. Clevises 112 are each pivotally attached to frame side members 32 and 34 at a specified location using a fastener 116 such as a shoulder bolt or clevis pin. Linkage members 108 and 110 are made of high strength aluminum tubing and the distance between pivot 82 mounting point and clevis 112 mounting point is 51 centimeters. Those of ordinary skill in the art will recognize that a variety of materials and construction are available for linkage members 108 and 110. Examples of other materials include strong and lightweight material such as ABS plastic tube or rod, or graphite composite tube, and titanium tubing. Examples of other possible construction methods include side members with varying shapes or contours to match the contour of a user's back. Also, linkage members 108 and 110 could be from a semi-flexible material such as fiberglass or composite graphite that would allow for the removal of clevis 112.

Figure 17:
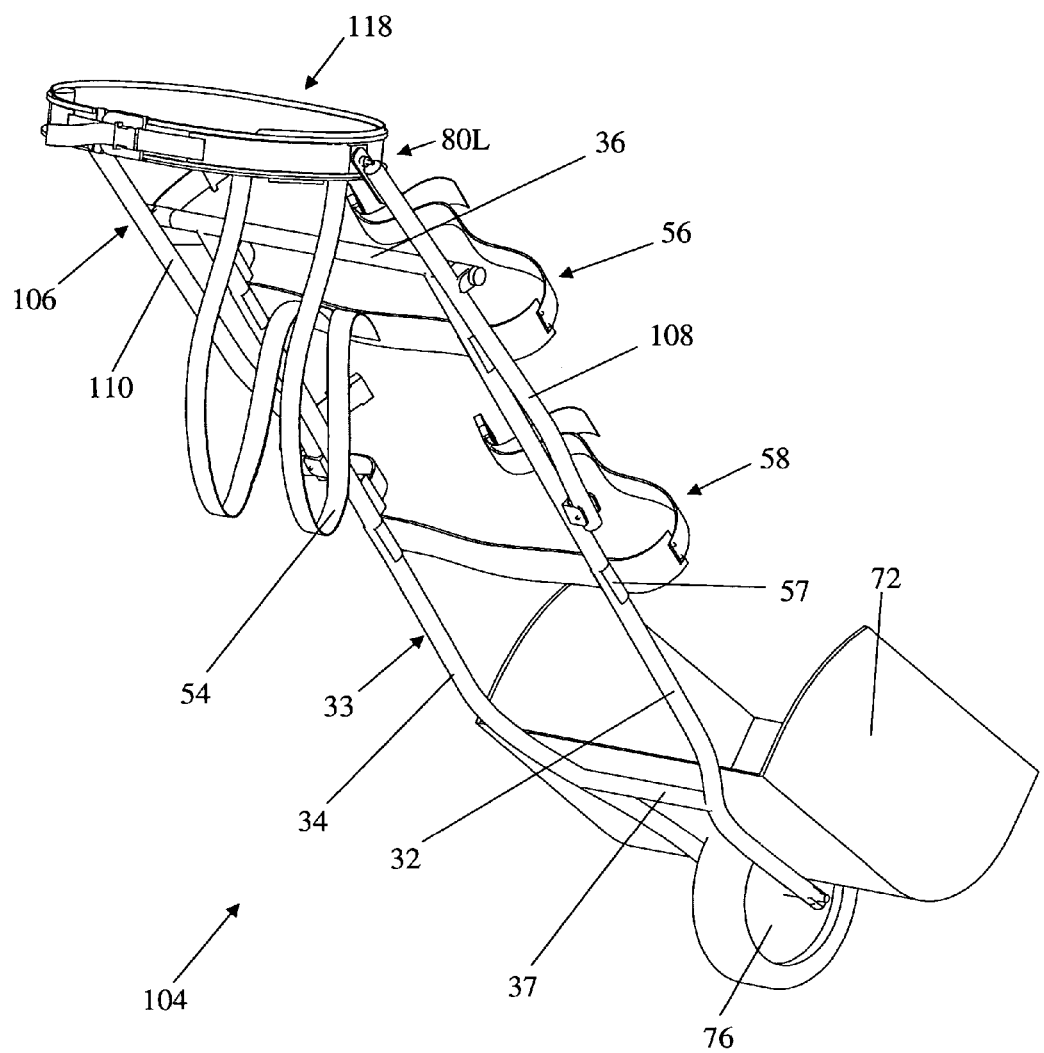
FIG. 17 shows front-side view of carrier having the slip belt harness.

Shoulder straps 54 shown in FIGS. 16 and 17 are attached to load support 56 and slip belt 126 in a manner as previously discussed.

OPERATION—SECOND ALTERNATIVE EMBODIMENT

Figure 18:
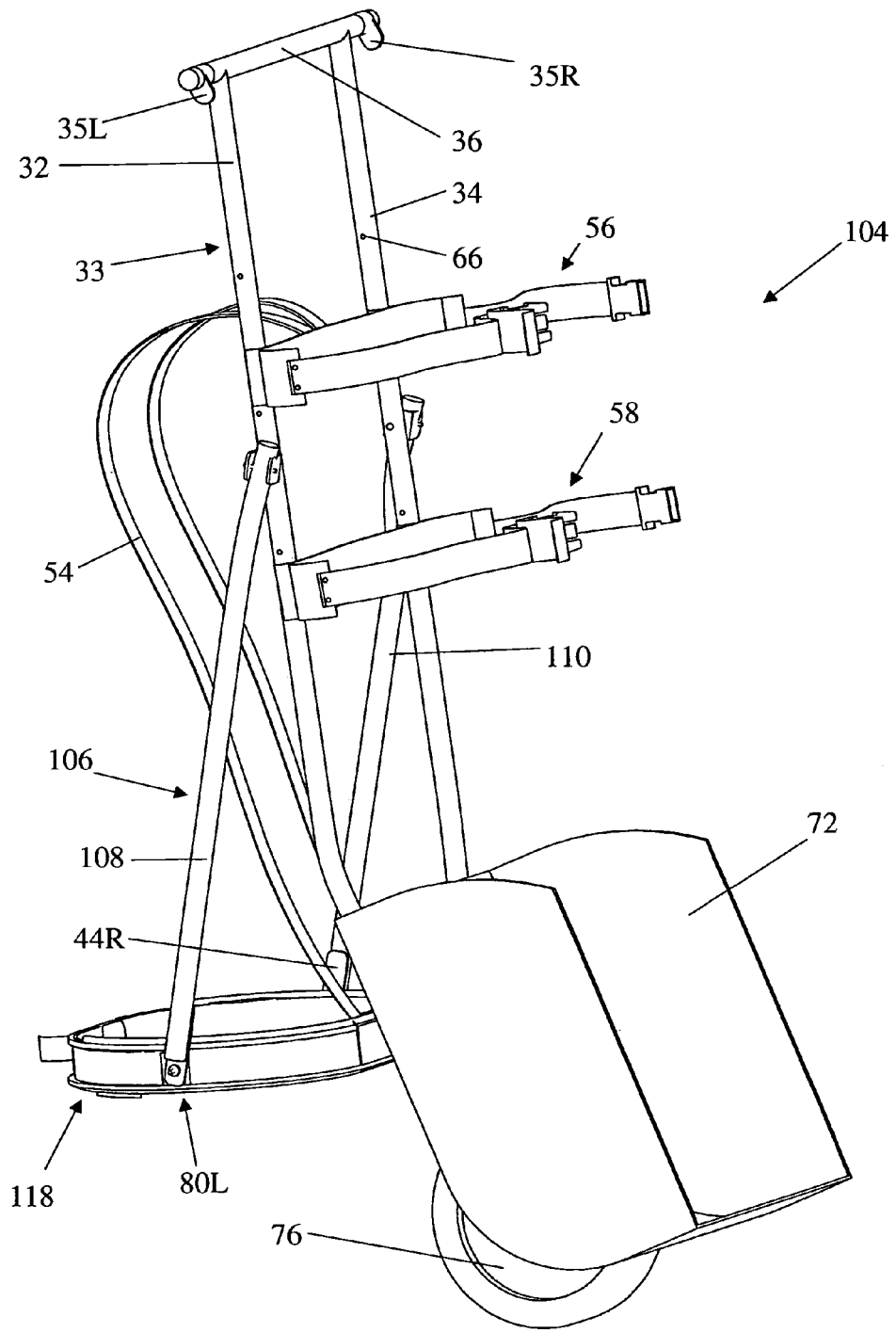
FIG. 18 shows rear-side view of carrier with slip belt harness in a position as it would be on the user's back.

Carrier 104 as shown in FIGS. 16 and 18, allows the user to transport items on frame 33 in primarily 2 different ways as discussed previously. Additionally, this embodiment has several benefits for the user that all prior art is lacking. In addition to the ability to transfer frame 33 to the user's back easily and without removal of carrier 106 from the user, the user now has the ability to rotate completely around within harness 118 while still attached to carrier 104. This is a benefit when navigating trails with tight bends, but also the user now has access to the load being carried. Items being transported are now available to the user without removal of the transportation equipment. As examples, tools, food, camera equipment, camping or hunting equipment, etc. can be carried on the user's back and accessed by lowering frame 33 and rotating within harness 118 to obtain access to the items. This was an unknown problem since conventional art shows that removal of the transportation means such as a carrier or backpack is necessary in order to get access to the items being transported. In regard to navigating trails, there is no turning radius for this embodiment since the user can turn around within harness 118 and walk back the direction they came while pushing carrier 104 in front of them. Pushing carrier 104 in this manner in a hands-free fashion is a third way items can be transported with this embodiment.

A conventional backpack or duffel bag filled with equipment, hereafter referred to as the load, is placed onto frame 33 and secured onto load securing mechanisms 56 and 58 as previously discussed. Inner belt 120 is placed around the user's waist and fastened using buckle 122. Outer belt 126 with carrier 104 attached is then mounted to belt 120 between upper track guide 134 and lower track guide 136 and fastened using buckle 128. In the tow position the front end of frame 33 is supported by linkage 106.

As the user turns such as to navigate bends on a trail, the user can rotate inside user harness 118. Upper and lower track guides 134 and 136 form a track on inner belt 120 that outer slide belt 126 is placed into. Outer slide belt 126 is secured to the user much as a conventional belt using quick release buckle mechanism 122. Linkage 106 is attached to left and right hitch mechanisms 80L and 80R. The weight of the load is transferred to hitch mechanisms 80L and 80R and to lower track guide 136 and then to the user's hips. As the user rotates, inner belt 120 rotates with the user while outer belt 126 remains stationary. Outer belt 126 is sliding in a track on inner belt 120 formed by upper and lower track guides 134 and 136, respectively. The user can disconnect carrier 30 quickly by releasing buckle mechanism 128 on outer slide belt 126 that would cause outer belt 126 along with carrier 30 to separate. To reduce friction between outer slide belt 126 and inner waist belt 120, a friction reducing element such as PTFE material or dry lubricant can be applied to the outer surface of waist belt 120 at the general location of the user's hips. Small cylindrical rollers (not shown) could also be utilized between outer belt 126 and inner belt 120 at these locations to minimize friction. As the user rotates, the distance between hitch mechanisms 80L and 80R will change requiring linkage members 108 and 110 to pivot approximately 5 degrees about clevis pin 114. This pivoting about clevis pin 114 varies based on the shape of the user's waist and the form of harness 118 as worn by the user. Since the pivoting of linkage members 108 and 110 about clevis pin 114 is small, devises 112 could be removed from the design provided linkage members 108 and 110 can flex enough to allow for user rotation within harness 118. Frame alignment guides 35L and 35R provide lateral support for frame 33 between linkage members 108 and 110.

As the user comes to an obstacle such as a foot bridge requiring carrier 104 along with the secured load to be placed on the back of the user, frame 33 is transferred to the user's back as previously described. The weight of frame 33 is now transferred to the user's hips. Frame 33 can be lowered back to the tow position with wheel 76 on the ground as previously described.

DESCRIPTION—ADDITIONAL EMBODIMENTS

Figure 22:
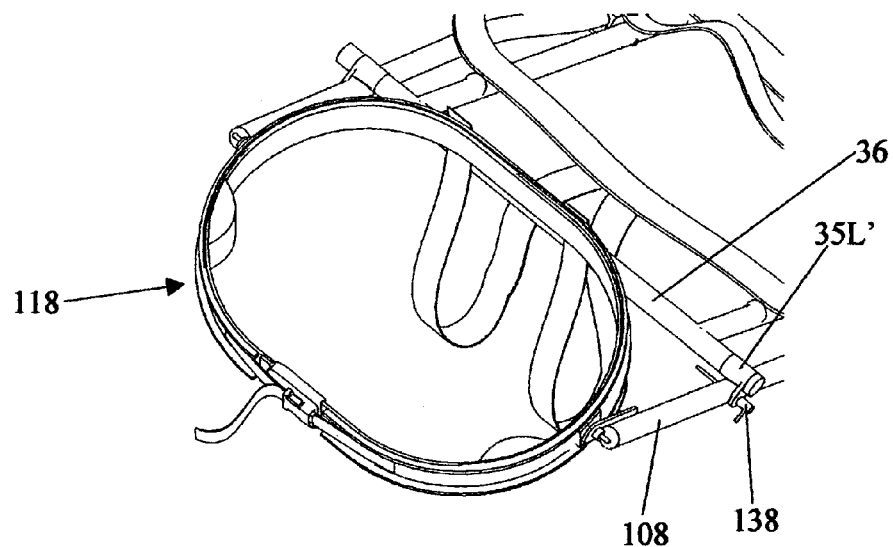
FIG. 22 shows a top view of an alternate configuration of the carrier having the slip belt harness with a quick release pin locking the linkage to the frame.

Another embodiment is shown in FIGS. 21 and 22. This embodiment is similar to the one shown in FIG. 16 with the addition of a quick release pin 138 to secure frame 33 to linkage 106. An alignment guide 35L' is adapted to receive pin 138. Pin 138 is inserted through alignment guide 35L' and linkage member 108. In this configuration, frame 33 is fastened to linkage 106 such that linkage 106 and frame 33 form a single support structure. The operation of this embodiment is similar to the one shown in FIG. 16 with the exception that pin 138 needs to be removed by the user prior to transferring frame 33 on the user's back. This embodiment with linkage 106 and frame 33 forming a rigid structure has several benefits over prior art. The first is that the user has access to the load being carried and also the user can turn completely around while wearing harness 118 and towing carrier 104. Also, when towing carrier 104, the user bears their proportion of the weight of carrier 104 completely on harness 118, which frees up the user's back and increases enjoyment, safety and comfort for the user. As previously stated, prior art such Lemon, U.S. Pat. No. 4,236,723 and Cepull, U.S. Pat. App. 20040150175 have limited or no turning provision for the user, making navigation of trails difficult. It is apparent to those skilled in the art that linkage 106 and frame 33 could both be replaced with a single support structure (not shown) which is attached to user harness 118 at on end and has wheel 76 mounted at the opposite end.

Another embodiment is comprised of previously described user harness 118 and linkage 106 as shown in FIG. 16 and previously described frame 90, wheels 100L and 100R, and load basket 99 as shown in FIG. 17. Frame 90 is pivotally connected at a predetermined location on side members 84 and 85 to the rear end of linkage 106 such that the front end of frame 90 rests on linkage 106 to form a support structure. The operation and benefits of this embodiment are the same as the previously described carriers shown in FIG. 17 with wheels 100L and 100R providing greater stability for unbalanced loads.

Another embodiment is the previously described carrier as shown in FIG. 16 without wheel 76. This embodiment would allow a user to carry items primarily on the user's back in a manner like a conventional backpack. The benefit of this embodiment is the user has a convenient way to mount and dismount the equipment to and from their back as previously discussed. Additionally, the user could tow this embodiment behind them when conditions warrant it such as terrain covered with snow, ice, or sand. Load basket 99 would function as a ski in these conditions by providing support for frame 33 on the terrain while protecting the items being transported.

CONCLUSION, RAMIFICATION, SCOPE

Accordingly, the reader will see that the carrier of the invention provides a versatile and convenient method for transporting items over varying terrain. In addition, the carrier of the invention increases the safety and enjoyment of the user when transporting items while at the same time reducing user fatigue. The carrier can easily allow the user to switch from towing the carrier in a hands-free manner to carrying it on the their back like a conventional backpack or visa versa. When towing the carrier, a majority of the weight of the items being transported is carried by the carrier's wheel(s), which reduces user fatigue. Also, with the carrier attached to the user's waist, the weight of the items carried on the carrier will not compound any user injuries suffered from falls. The carrier can provide sharp turning ability for the user when necessary. Additionally, the carrier can allow the user to access the items being transported without removal of the carrier from the user. With the aforementioned benefits of the carrier of the invention, further uses are easily identified. For instance, the carrier can be adapted to carry a child or infant who can be towed behind or carried by the parent. Also, the carrier can be adapted to carry water tanks for fighting fires as in remote wilderness areas. Additionally, the carrier can also be adapted to mount motors for purposes such as leaf blowers, grass cutters or insecticide sprayers. Also, street vendors can use the carrier to transport and sell goods. Additionally, the carrier can be used as a way to easily mount conventional backpacks whereby the user first puts on the harness and then transfers the backpack to the users back using a linkage member between the pack and the harness. Still other uses for the carrier could be by hunters to carry game or even as a method to carry wounded hikers.

Although the description above contains much specificity, these should no be construed as limiting the scope of the invention but as merely providing illustrations of some of the presently preferred embodiments of this invention. As examples, the carrier can be made from many types of materials or can have many different shapes such as bends to meet the needs of the item being transported. Additionally component of the carrier such as the frame or linkage could be formed in single piece using injected molded manufacturing methods. Also, the frame and linkage could be made in a telescoping fashion to allow for length adjustment. The frame can have alternate mounting methods to adapt to the items such as multiple tie-down points or even an integral pack attached directly to the frame. Shoulder straps could be mounted in varying ways to meet the user's needs. Also, there are many ways to pivotally couple the carrier to the user harness such as by cap and ball type hitches.

Thus the scope of the invention should be determined by the appended claims and their legal equivalents, rather than by the examples given.

I claim:

1. A carrier comprising:
    a frame including a frame member operable to support a load placed on the frame, the frame member having a frame-member front end and a frame-member rear end opposite the front end;
    a wheel attached to the frame-member rear end, and operable to support the frame member while the wheel rolls on the ground;
    a harness operable to mount the frame to an operator;
    a linkage including a linkage member having a linkage-member front end pivotally attached to the harness, and a linkage-member rear end pivotally attached to the frame member, the linkage member operable to position the frame relative to the harness in a first position wherein the wheel contacts ground and in a second position wherein the wheel is suspended above ground; and
    a strap fastened to the frame and to the harness, and operable to additionally mount the frame to the operator while the frame is in the second position.

2. The carrier of claim 1 wherein the linkage-member rear end is pivotally attached to the frame member between the frame-member front and rear ends.

3. The carrier of claim 1 wherein the carrier includes a single wheel.

4. The carrier of claim 1 wherein the frame includes two frame members side-by-side and spaced apart.

5. The carrier of claim 1 wherein the linkage includes two linkage members side-by-side and spaced apart.

6. The carrier of claim 1 further comprising a load strap for securing a load to the frame.

7. The carrier of claim 1 further comprising a basket for holding a load to the frame.

* * * * *